(12) United States Patent
Naruse et al.

(10) Patent No.: US 9,028,056 B1
(45) Date of Patent: May 12, 2015

(54) INK FOR INKJET RECORDING, INK CONTAINER, INKJET RECORDER AND RECORDED MATTER

(71) Applicants: Mitsuru Naruse, Shizuoka (JP); Masayasu Nonogaki, Shizuoka (JP); Akihiko Matsuyama, Shizuoka (JP); Keita Katoh, Shizuoka (JP); Kazukiyo Nagai, Shizuoka (JP); Yuusuke Koizuka, Shizuoka (JP)

(72) Inventors: Mitsuru Naruse, Shizuoka (JP); Masayasu Nonogaki, Shizuoka (JP); Akihiko Matsuyama, Shizuoka (JP); Keita Katoh, Shizuoka (JP); Kazukiyo Nagai, Shizuoka (JP); Yuusuke Koizuka, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/505,667

(22) Filed: Oct. 3, 2014

(30) Foreign Application Priority Data

Oct. 21, 2013 (JP) .................. 2013-218279
Oct. 25, 2013 (JP) .................. 2013-222472
Sep. 2, 2014 (JP) .................. 2014-177775

(51) Int. Cl.
*G01D 11/00* (2006.01)
*C09D 11/106* (2014.01)
*B41J 2/175* (2006.01)
*C09D 11/322* (2014.01)
*C09D 133/08* (2006.01)

(52) U.S. Cl.
CPC ........... *C09D 11/106* (2013.01); *B41J 2/17503* (2013.01); *C09D 11/322* (2013.01); *C09D 133/08* (2013.01)

(58) Field of Classification Search
CPC ... G09D 11/322; G09D 11/326; G09D 11/30; G09D 11/02; B41J 2/015; B41J 2/17503
USPC ................ 347/86, 95, 100; 106/31.13, 31.51; 428/195.1, 207
See application file for complete search history.

(56) References Cited

U.S. PATENT DOCUMENTS

| | | | |
|---|---|---|---|
| 8,845,800 B2 * | 9/2014 | Gotou et al. | 106/31.43 |
| 8,883,275 B2 * | 11/2014 | Nagashima et al. | 428/32.1 |
| 2012/0242741 A1 | 9/2012 | Hasegawa et al. | |
| 2012/0328854 A1 | 12/2012 | Matsuyama et al. | |
| 2014/0072779 A1 | 3/2014 | Matsuyama et al. | |
| 2014/0092180 A1 | 4/2014 | Matsuyama et al. | |
| 2014/0120331 A1 | 5/2014 | Koizuka et al. | |
| 2014/0141209 A1 | 5/2014 | Koizuka et al. | |
| 2014/0199530 A1 | 7/2014 | Katoh et al. | |

FOREIGN PATENT DOCUMENTS

| | | |
|---|---|---|
| JP | 2004-123904 | 4/2004 |
| JP | 2009-513802 | 4/2009 |
| JP | 2011-122072 | 6/2011 |
| JP | 2012-051357 | 3/2012 |
| JP | 2012-233163 | 11/2012 |
| JP | 2014-114409 | 6/2014 |
| WO | WO 2007/053563 A2 | 5/2007 |

* cited by examiner

*Primary Examiner* — An Do

(74) *Attorney, Agent, or Firm* — Oblon, McClelland, Maier & Neustadt, L.L.P.

(57) ABSTRACT

An ink for inkjet recording includes water; a hydrosoluble organic solvent; a pigment; and a polymer including a first structural unit represented by the following formula (1):

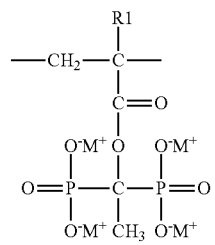
(1)

wherein R1 represents a hydrogen atom or a methyl group; and $M^+$ represents at least one member selected from the group consisting of alkali metal ions, organic amine ions and hydrogen ions; and a second structural unit represented by the following formula (2) or (3):

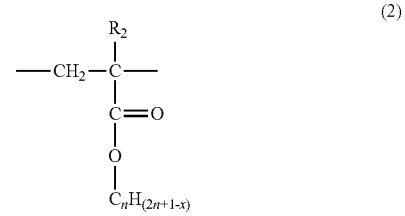
(2)

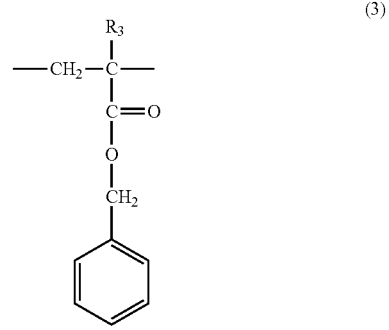
(3)

wherein each of $R_2$ and $R_3$ represents a methyl group or a hydrogen atom; n represents an integer of 18; x represents 0 or an integer of 2.

17 Claims, 4 Drawing Sheets

INK FOR INKJET RECORDING, INK CONTAINER, INKJET RECORDER AND RECORDED MATTER

CROSS-REFERENCE TO RELATED APPLICATIONS

This patent application is based on and claims priority pursuant to 35 U.S.C. §119 to Japanese Patent Applications Nos. 2013-218279, 2014-177775 and 2013-222472, filed on Oct. 21, 2013, Sep. 2, 2014 and Oct. 25, 2013 respectively in the Japan Patent Office, the entire disclosure of which is hereby incorporated by reference herein.

BACKGROUND

1. Technical Field

The present invention relates to an ink for inkjet recording (hereinafter referred to as an "ink"), an ink container, an inkjet recorder and a recorded matter.

2. Description of the Related Art

Inkjet recording methods have been popular as image forming methods because of having advantages of having simpler process and easier full-colorization than other recording methods, and producing high-resolution images even with an apparatus having simple composition. The inkjet recording methods have a small amount of ink soar and adhere to recording media such as papers to form images thereon with an inkjet recorder, and applications thereof are expanding, e.g., personal and industrial printers and printings.

In the inkjet recording methods, an aqueous ink using a hydrosoluble dye is mostly used as a colorant. However, the ink has disadvantages of having poor weatherability and water resistance. Therefore, a pigment ink using a pigment instead of the hydrosoluble dye has been studied recently. However, the pigment ink is still inferior to the dye ink in colorability, ink discharge stability and preservation stability.

In company with improvement of higher-quality image technology of OA printers, even when recorded on plain papers as recording media with the pigment ink, image density equivalent to that of the dye ink is required. However, the pigment ink penetrates into a plain paper as a recording medium and pigment density at the surface of the paper lowers, resulting in lower image density.

High-speed printing is desired because demands for industrial applications have particularly been increasing recently. Inkjet printers equipped with line heads are suggested for the high-speed printing. In order to dry the ink adhering to the recording medium quicker to print quicker, a penetrant is added to the ink for water to penetrate into the recording medium. Then, not only water but also pigment penetrates deeper into the recording medium, resulting in lower image density.

When a plain paper is used as a recording medium, the surface of the plain paper swells due to water which is a solvent of the ink and a difference of extension rate between the front side and the back side of the paper becomes large, resulting in curl. This has not been a problem in low-speed printing because of being solved as the paper is dried. However, in high-speed printing, paper jam may occur because a recording medium is fed with curl unsolved. An organic solvent in the ink is effectively increased to solve curl. However, it becomes difficult to assure storage stability of the ink because of being more hydrophobic.

In order to solve this problem, PCT Japanese published national phase application No. 2009-513802 discloses an inkjet composition including a liquid vehicle, a colorant, and a polymer having at least one functional group having a specific calcium index value. Monomers forming the polymer include 4-methacrylamide-1-hydroxybutane-1,1-diphosphonic acid. The colorant is destabilized by the diphosphonic acid group and Ca salt in a paper when contacting the paper, and the resultant printed image improves in quality.

Japanese published unexamined application No. JP-2012-51357-A discloses an inkjet recording method of applying a receiving liquid including a Ca salt; and an ink including a pigment combined with a group having phosphorus, a resin emulsion and a surfactant thereon. It is disclosed that a bisphosphonic acid is preferably used as the group having phosphorus, which is reacted with the Ca salt in the receiving liquid to improve feathering and fixability. However, a polymer including phosphonic acid group is not used as dispersant or an additive in a pigment dispersion, and a pigment combined with a phosphoric acid is used.

Japanese published unexamined application No. JP-2004-123904-A discloses an aqueous ink including a colorant, water, hydrosoluble organic solvent, a surfactant and a chelate agent. A low-molecular-weight hydroxy ethylidenediphosphonic acid or its salt is used as the chelate agent. The chelate agent removes calcium included in a pigment dispersion to improve discharge stability and storage stability of the ink. However, only the low-molecular-weight hydroxyethylidenediphosphonic acid is disclosed, and a polymer including a phosphonic acid is not disclosed. A relation between the chelate agent and improvement of the image density of an image when recorded on a plain paper is not disclosed, either.

SUMMARY

Accordingly, one object of the present invention is to provide an ink for inkjet recording, forming an image having high image density, and good storage stability even when including a hydrosoluble organic solvent in a large amount.

Another object of the present invention is to provide an ink container containing the ink.

A further object of the present invention is to provide an inkjet recorder using the ink.

These objects and other objects of the present invention, either individually or collectively, have been satisfied by the discovery of an ink for inkjet recording, including water; a hydrosoluble organic solvent; a pigment; and a polymer including a first structural unit represented by the following formula (1):

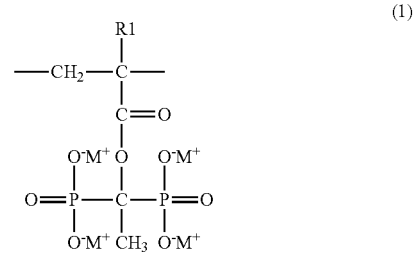

wherein R1 represents a hydrogen atom or a methyl group; and M⁺ represents at least one member selected from the group consisting of alkali metal ions, organic amine ions and hydrogen ions; and a second structural unit represented by the following formula (2) or (3):

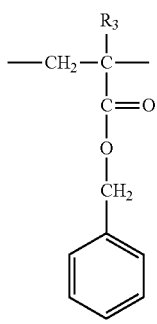

(3)

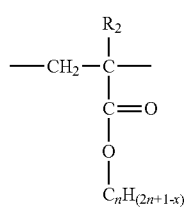

(2)

wherein each of $R_2$ and $R_3$ represents a methyl group or a hydrogen atom; n represents an integer of 1 8; and x represents 0 or an integer of 2.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
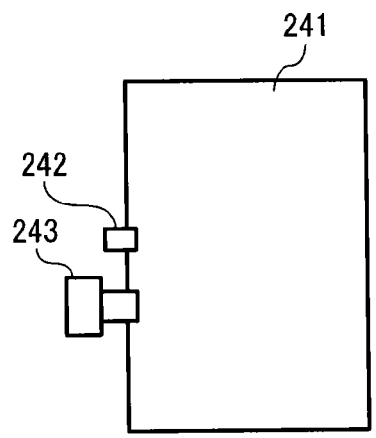
FIG. 1 is a schematic view illustrating an embodiment of the ink container of the present invention.

The present invention provides an ink for inkjet recording, forming an image having high image density, and good storage stability even when including a hydrosoluble organic solvent in a large amount.

<Ink for Inkjet Recording>

The ink of the present invention includes water, a hydrosoluble organic solvent, a polymer (hereinafter referred to as polymer Q) including a structural unit represented by the formula (1) and another structural unit represented by the formula (2) or (3), and other components further when necessary.

(Polymer Q)

The polymer Q has a dibasic acid structure including adjacent phosphonic acid groups as a structural unit represented by the formula (1), and includes many diphosphonic acid groups in its molecule differently from low-molecular-weight compounds. As a result, the polymer Q has more hydrophilic groups in its molecule than a monobasic acid and has goo hydrophilicity. The phosphonic acid groups are easy to react with Ca ions and chelates the Ca ions because of being dibasic acid groups, and combine with the Ca ions more tightly to be hydrophobized.

The structural unit represented by the formula (2) or (3) prevents phosphonic acid groups from gathering in the polymer Q for unknown reasons to further improve storage stability of the ink. In addition, the structural unit represented by the formula (2) or (3) improves adsorbability of the polymer Q to a pigment for unknown reasons. Therefore, the polymer Q can be used as a dispersant of a pigment as well.

Therefore, an ink including the polymer Q not only improves in dispersion and storage stability, but also is capable of producing images having higher image density even on a plain paper including less Ca ions because Ca ions dissolved out from the paper to the ink hydrophobize the structural unit represented by the formula (1), and the structural unit represented by the formula (2) or (3) having high adsorbability to a pigment agglutinates together with a pigment to retain the pigment on the paper.

The ink preferably includes the polymer Q, but are not limited to, in an amount of from 0.05 to 10% by weight, more preferably from 0.5 to 5% by weight, and furthermore preferably from 1 to 3% by weight. The ink does not substantially improve in image density until including the polymer Q not less than 0.05% by weight, and has suitable viscosity in discharging from head when including the polymer Q not greater than 10% by weight.

The polymer Q used as a pigment dispersant further improves image density on a plain paper and storage stability of an ink including a hydrosoluble organic solvent in a large amount.

When the polymer Q is used as a pigment dispersant, besides the structural unit represented by the formula (1) and the structural unit represented by the formula (2) or (3), the ink preferably includes a structural unit coming from a hydrophobic polymerizable monomer. The hydrophobic polymerizable monomer is mentioned later.

The ink preferably includes the polymer Q when used as a pigment dispersant, but are not limited to, in an amount of from 1 to 100 parts by weight, more preferably from 5 to 80 parts by weight, and furthermore preferably from 10 to 50 parts by weight per 100 parts by weight of the pigment. When 5 to 80 parts by weight, the ink produces images having high image density, and improves in pigment dispersion stability and storage stability.

Specific examples of the alkali metal in the alkali metal ion of $M^+$ in the formula (1) include, but are not limited to, lithium, sodium and potassium.

Specific examples of the organic amine in the organic ammonium ion of $M^+$ include, but are not limited to, alkyl amines such as mono, di or trimethylamine and mono, di or triethylamine; alcohol amines such as ethanol amine, diethanolamine, triethanolamine, methylethanolamine (2-(methylamine)ethanol), methyldiethanolamine, dimethylethanolamine, monopropanolamine, dipropanolamine, tripropanolamine, isopropanolamine, trishydroxymethylaminomethane and 2-amino-2-ethyl-1,3propanedil (AEPD); and cyclic amine such as choline, morpholine, N-methylmorpholine, N-methyl-2-pyrrolidone and 2-pyrrolidone.

Particularly, the potassium ion is preferably used in terms of image density and storage stability.

Not less than half or all of $M^+$ are preferably alkali metal ions or organic ammonium ions, and the rest is preferably a hydrogen ion (proton).

The structural unit represented by the formula (1) is preferably a structural unit represented by the following formula (4):

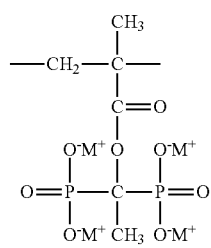

(4)

wherein $M^+$ represents at least one member selected from the group consisting of alkali metal ions, organic amine ions and hydrogen ions.

The structural unit represented by the formula (2) is preferably a structural unit represented by the following formula (5).

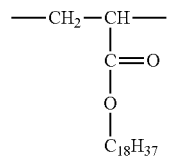

(5)

The structural unit represented by the formula (3) is preferably a structural unit represented by the following formula (7).

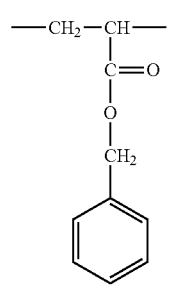

(7)

Specific examples of the structural unit represented by the formula (2) include compounds represented by the following formulae (2a) and (2b):

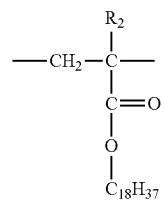

(2a)

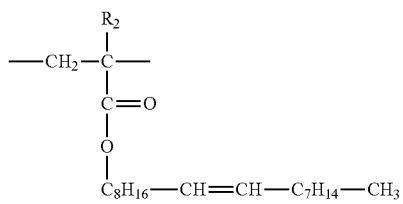

(2b)

wherein $R_2$ represents a methyl group or a hydrogen atom.

Both of these have a straight-chain aliphatic hydrocarbon group (C18). Namely, the former structural unit includes a stearyl group and the latter structural unit includes an oleyl group. The former structural unit can easily be introduced in a polymer using a stearylmethacrylate or stearylacrylate, and the latter structural unit can easily be introduced in a polymer using oleyl methacrylate or oleyl acrylate, The structural unit represented by the formula (4), and a member selected from the group consisting of the structural unit represented by the formula (5), a structural unit represented by the following formula (6) and the structural unit represented by the formula (7) further improve image density and storage stability of a pigment dispersion.

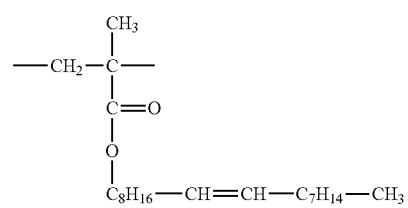

(6)

The polymer Q can include a structural unit coming from a polymerizable monomer besides the structural unit represented by the formula (1) and the structural unit represented by the formula (2) or (3).

Specific examples of the polymerizable monomer include, but are not limited to, polymerizable hydrophobic monomers and polymerizable hydrophilic monomers.

Specific examples of the polymerizable hydrophobic monomers include, but are not limited to, unsaturated ethylene monomers having an aromatic ring such as styrene, α-methylstyrene, 4-t-butylstyrene and 4-chloromethylstyrene; alkyl(meth)acrylate such as methyl(meth)acrylate, ethyl(meth)acrylate, n-butyl(meth)acrylate, dimethyl maleate, dimethyl itaconate, dimethyl fumarate, lauryl(meth)acrylate (C12), tridecyl(meth)acrylate (C13), tetradecyl(meth)acrylate (C14), pentadecyl(meth)acrylate (C15), hexadecyl (meth)acrylate (C16), heptadecyl(meth)acrylate (C17), nonadecyl(meth)acrylate (C19), eicosyl(meth)acrylate (C20), heneicosyl(meth)acrylate (C21) and docosyl(meth) acrylate (C22); unsaturated ethylene monomers having an alkyl group such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-dimethyl-1-hexene, 1-nonene, 3,5,5-trimethyl-1-hexene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene and 1-docosene. These can be used alone or in combination.

Specific examples of the polymerizable hydrophilic monomers include, but are not limited to, anionic unsaturated ethylene monomers such as a (meth)acrylic acid or its salt, a maleic acid or its salt, monomethyl maleate, an itaconic acid, monomethyl itaconate, a fumaric acid, 4-styrenesulfonic acid and 2-acrylamide-2-methylpropane sulfonic acid; and nonionic unsaturated ethylene monomers such as (meth)acrylic acid-2-hydroxyethyl, diethyleneglycol mono(meth)acrylate, triethyleneglycol mono(meth)acrylate, tetraethyleneglycol mono(meth)acrylate, polyethyleneglycol mono(meth)acrylate, (meth)acrylamide, N-methylol (meth)acrylamide, N-vinyl formamide, N-vinyl acetoamide, N-vinyl pyrrolidone, acrylamide, N,N-dimethylacrylamide, N-t-butylacrylamide, N-octyl acrylamide and N-t-octyl acrylamide.

The polymer Q preferably includes the structural unit represented by the formula (1), but are not limited to, in an amount of from 5 to 80% by weight, more preferably from 10 to 60% by weight, and furthermore preferably from 20 to 40% by weight. When 10 to 60% by weight, the ink produces images having high image density, and improves in pigment dispersion stability and storage stability.

The polymer Q preferably includes the structural unit represented by the formula (2) or (3), but are not limited to, in an amount of from 20 to 95% by weight, and more preferably from 40 to 70% by weight. When 40 to 70% by weight, the ink produces images having high image density, and improves in pigment dispersion stability and storage stability.

(Method of Preparing Polymer Q)

The polymer Q can be prepared by the following method.

Namely, after compounds represented by the following formulae (8) and (9) or (10) are polymerized, or after the compounds represented by the formulae (8), (9) or (10) and the polymerizable monomer are copolymerized, the resultant polymerized or the copolymerized product is neutralized with an alkali metal base or an organic amine base:

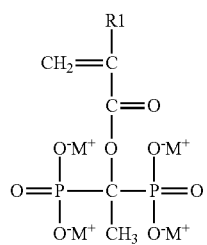
(8)

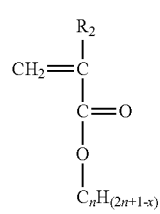
(9)

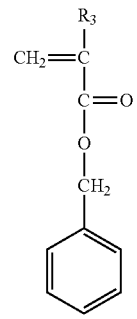
(10)

wherein each of $R_1$, $R_2$ and $R_3$ represents a hydrogen atom or a methyl group; n represents an integer of 18; and x represents 0 or an integer of 2.

Alternatively, the compound represented by the formulae (8) previously neutralized with an alkali metal base or an organic amine base may be copolymerized with the compound represented by the formula (9) or (10).

Specifically, after a solvent, the compounds represented by the formulae (8), (9) or (10) and the polymerizable monomer when necessary are reacted with a polymerization initiator under a nitrogen gas stream at 60 to 150° C. in a flask equipped with a stirrer, a thermometer and a nitrogen introduction pipe, the reactant is neutralized with the alkali metal base or the organic amine base.

Specific examples of the compound represented by the formula (8) include 1-methacryloxyethane-1,1-diphosphonic acid represented by the following formula (11) when R1 is a methyl group and 1-acryloxyethane-1,1-diphosphonic acid represented by the following formula (12) when R1 is a hydrogen atom.

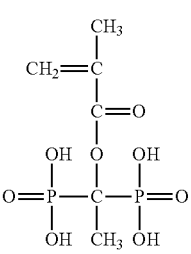
(11)

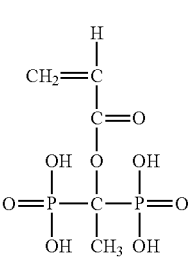
(12)

These compounds can be synthesized by a method disclosed in Japanese published unexamined application No. JP-S58-222095-A.

Specific examples of the compound represented by the formula (9) include stearylmethacrylate represented by the following formula (13), stearylacrylate represented by the following formula (14), oleyl methacrylate represented by the following formula (15) and oleyl acrylate represented by the following formula (16).

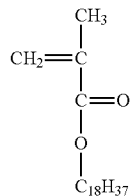
(13)

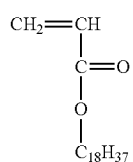
(14)

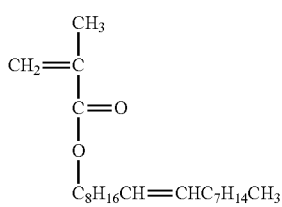
(15)

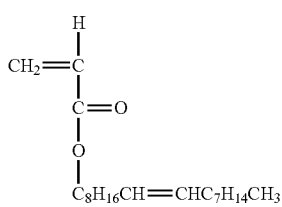
(16)

Specific examples of the compound represented by the formula (10) include benzyl methacrylate represented by the following formula (17) when $R_3$ is a methyl group and benzyl acrylate represented by the following formula (18) when $R_3$ is a hydrogen atom.

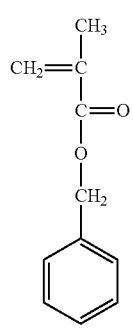
(17)

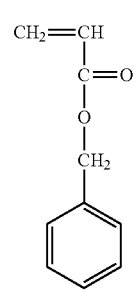
(18)

The polymer Q is preferably synthesized by a method using a radical polymerization initiator because the polymerization operation and the molecular weight control are simple. A solution polymerization method polymerizing in an organic solvent is more preferably used. Specific examples of the solvent include, but are not limited to, ketone solvents such as methanol, ethanol, acetone, methyl ethyl ketone and methyl isobutyl ketone; ester acetate solvents such as ethyl acetate and butyl acetate; aromatic hydrocarbon solvents such as benzene, toluene and xylene; isopropanol; ethanol; cyclohexane; tetrahydrofuran; dimethylformamide; dimethylsulfoxide; and hexamethyl phosphoamide. Among these, ketone solvents, ester acetate solvents and alcohol solvents are preferably used.

Specific examples of radical polymerization initiators include, but are not limited to, such as peroxyketal, hydroperoxide, dialkylperoxide, diacylperoxide, peroxydicarbonate, peroxyester, cyano azobisisobutylonitrile, azobis(2,2'-isovaleronitrile), and non-cyano dimethyl-2,2'-azobisisobutylate. Organic peroxides and azo compounds having an easily-controllable molecular weight and a low decomposition temperature are preferably used, and the azo compounds are more preferably used. The polymerization initiators are preferably used in an amount of from 1 to 20% by weight based on total weight of polymerizable monomers.

The polymer Q may include a chain-transfer agent in a proper amount to control its molecular weight. Specific examples thereof include, but are not limited to, mercapto acetic acid, mercapto propionic acid, 2-propanethiol, 2-mercaptoethanol, thiophenol, dodecylmercaptan, 1-dodecanethiol and thioglycerol.

The polymerization temperature is preferably, but are not limited to, from 50 to 150° C., and more preferably from 60 to 100° C. The polymerization time is preferably, but is not limited to, from 3 to 48 hrs.

The phosphonic acid groups of the polymer Q are partially or all neutralized with the alkali metal base or the organic amine base. The neutralization can be made while a pigment and the polymer Q are mixed with each other in the process of preparing an ink.

In the present invention, the neutralization index of the phosphonic acid groups in the neutralized polymer Q is defined by the following formulae. This is different from a ratio of a proton in the copolymer actually substituted with a metallic ion or an organic amine ion.

When the compound represented by the formula (7) is monomer 1,

Neutralization index(%)=(molar number of base added×valence of cation of base)/(molar number of monomer 1 included in polymer Q×4)×100

Molar number of base added=added amount of base Yg/molecular weight of base

Molar number of monomer 1 included in polymer Q=charge-in quantity of monomer 1/molecular weight of monomer 1

Therefore, base quantity needed to obtain neutralization index (%) is determined by the following formula.

Added amount of base $Yg$=neutralization index(%)×(molar number of monomer 1 included in polymer $Q$×4)×molecular weight of base/(valence of cation of base×100×/molecular weight of monomer 1).

The polymer Q preferably has a weight-average molecular weight of, but are not limited to, from 2,000 to 70,000, more preferably from 4,000 to 50,000 and furthermore preferably from 6,000 to 30,000. The weight-average molecular weight can be measured by gel permeation chromatography (GPC).

The weight-average molecular weight of the polymer Q is somewhat controllable by the polymerization temperature, an amount of the polymerization initiator and the monomer concentration in the reaction.

The polymer Q tends to have a low molecular weight when polymerized at high temperature for a short time, and a high molecular weight when polymerized at low temperature for a long time.

The polymer Q tends to have a low molecular weight when including the polymerization initiator in a large amount, and a high molecular weight when including the polymerization initiator in a small amount The polymer Q tends to have a low molecular weight when the concentration of the monomer is high and a high molecular weight when the concentration thereof is low.

<Water>

As the water, ion-exchanged water, ultrafiltrated water, Mill Q water, pure water such as distilled water or ultrapure water can be used.

The content of the water used in the ink for inkjet recording is not particularly limited.

<Pigment>

Inorganic pigments and organic pigments can be used as the pigment. These can be used alone or in combination.

Specific examples of the inorganic pigments include, but are not limited to, titanium oxide, iron oxide, calcium carbonate, barium sulfate, aluminum hydroxide, barium yellow, cadmium red, chrome yellow and carbon black. Among them, the carbon black is preferably used. The carbon black is produced by known methods such as a contact method, a furnace method, and a thermal method.

Specific examples of the organic pigment include, but are not limited to, azo pigments, azomethine pigments, polycyclic pigments, dye chelate, a nitro pigment, a nitroso pigment, and aniline black. Among them, the azo pigments and the polycyclic pigments are preferably used.

Specific examples of the azo pigments include, but are not limited to, azo lake, an insoluble azo pigment, a condensed azo pigment, and a chelate azo pigment. Specific examples of the polycyclic pigments include, but are not limited to, a phthalocyanine pigment, a perylene pigment, a perinone pigment, an anthraquinone pigment, a quinacridone pigment, a dioxazine pigment, an indigo pigment, a thioindigo pigment, an iso-indolinone pigment, and a quinophthalone pigment. Specific examples of the dye chelate include, but are not limited to, basic dye chelate, and an acid dye chelate.

Specific examples of the pigment for black ink include carbon black (C.I. Pigment Black 7) such as furnace black, lamp black, acetylene black, and channel black; metals such as copper, iron (C.I. Pigment Black 11); metal oxides such as titanium oxide; and organic pigments such as aniline black (C.I. Pigment Black 1).

The carbon black preferably has an average primary particle diameter of from 15 to 40 nm, a BET specific surface area of from 50 to 300 $m^2$/g, a DBP oil absorption of from 40 to 150 mL/100 g, a volatile matter content of from 0.5 to 10%, and a pH of from 2 to 9.

Marketed products can be used as carbon black. Specific examples thereof include, but are not limited to, No. 2300, No. 900, MCF-88, No. 3, No. 40, No. 45, No. 52, MA7, MA8, MA100 and No. 2200n from Mitsubishi Chemical Corp.; Raven 700, 5750. 5250, 5000, 3500 and 1255 from Columbian Chemicals Company; Regal 400R, 330R, 660R, Mogul L, Monarch 700, 800, 880, 900, 1000, 1100, 1300, Monarch 1400 from Cabot Corp.; Color Black FW1, FW2, FW2V, FW18, FW200, S150, S160, S170 from Degussa AG; Printex 35, U, V, 140U, 140V from Degussa AG; and Special Black 6, 5, 4A and 4 from Degussa AG.

Specific examples of the pigment for yellow ink include, but are not limited to, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 154, C.I. Pigment Yellow 155, C.I. Pigment Yellow 174 and C.I. Pigment Yellow 180.

Specific examples of the pigment for magenta ink include, but are not limited to, C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 176, C.I. Pigment Red 184, C.I. Pigment Red 185, C.I. Pigment Red 202 and Pigment Violet 19.

Specific examples of the pigment for cyan ink include, but are not limited to, C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Pigment Blue 63, C.I. Pigment Blue 66, Bat Blue 4 and Bat Blue 60.

New pigments may be used in the present invention. The above pigments may be used together therewith as long as the effect is not impaired.

When Pigment Yellow 74 as a yellow pigment, Pigment Red 122 or a Pigment Violet 19 as a magenta pigment and a Pigment Blue 15:3 as a cyan pigment are used, a well-balanced ink having good color tone and light resistance can be obtained.

The pigment preferably has a volume-average particle diameter (D50) not greater than 150 nm, and more preferably not greater than 100 nm to improve discharge stability and prevent the nozzle from clogging and the ink from discharge in a curve.

The volume-average particle diameter (D50) of the pigment us measured by Microtrac UPA from NIKKISO CO., LTD. in an environment of 23° C. and 55% RH.

The ink preferably includes the pigment in an amount of from 0.1 to 20% by weight, and more preferably from 1 to 20% by weight.

It is preferable that water, a pigment, a dispersant and other optional components are mixed and dispersed by a disperser to prepare a pigment dispersion in which a particle diameter thereof is adjusted and that the dispersion is included in the ink.

The pigment dispersion is preferably filtered to remove coarse particles and deaerated when necessary.

The pigment dispersion preferably includes a pigment in an amount of from 0.1 to 50% by weight, and more preferably from 0.1 to 30% by weight.

The polymer Q is preferably used as the pigment dispersion. Specific examples of other dispersants include to, surfactants such as anionic surfactants, cationic surfactant, ampholytic surfactants and nonionic surfactants; sodium naphthalenesulfonate formalin condensates; and polymeric dispersants. These can be used alone or in combination.

Specific examples of the anionic surfactant include, but are not limited to, alkylsulfocarboxylic acid salts, α-olefinsulfonic acid salts, polyoxyethylene alkyl ether acetic acid salts, N-acylamino acids or salts thereof, N-acylmethyltaurine salts, alkylsulfuric acid salts, polyoxyalkyl ether sulfuric acid salts, alkylsulfuric acid salts, polyoxyethylene alkyl ether phosphoric acid salts, rosin acid soap, castor oil sulfate ester salts, lauryl alcohol sulfate ester salts, alkylphenolic phosphate esters, alkylated phosphate esters, alkylarylsulfonic acid salts, diethyl sulfosuccinic acid salts, diethylhexyl sulfosuccinic acid salts, and dioctyl sulfosuccinic acid salts.

Specific examples of the cationic surfactant include, but are not limited to, 2-vinylpyridine derivatives and poly-4-vinylpyridine derivatives.

Specific examples of the amphoteric surfactant include, but are not limited to, betaine lauryldimethylamino acetate, 2-alkyl-N-carboxymethyl-N-hydroxyethylimidazolinium betaine, betaine coconut oil fatty acid amidopropyldimethylamino acetate, polyoctylpolyaminoethylglycine, and imidazoline derivatives.

Specific examples of the nonionic surfactant include, but are not limited to, ether based surfactants such as polyoxyethylene nonylphenyl ether, polyoxyethylene octylphenyl ether, polyoxyethylene dodecyl phenyl ether, polyoxyethylene octylphenyl ether, polyoxyethylene oleyl ether, polyoxyethylene lauryl ether and polyoxyethylene alkyl ether; ester based surfactants such as polyoxyethylene oleate esters, polyoxyethylene distearate esters, sorbitan laurate, sorbitan monostearate, sorbitan monooleate, sorbitan sesquioleate, polyoxyethylene monooleate and polyoxyethylene stearate; acetylene glycol (alcohol) based surfactants such as 2, 4,7,9-tetramethyl-5-decyne-4,7-diol, 3,6-dimethyl-4-octyne-3,6-diol and 3,5-dimethyl-1-hexine-3-ol.

Among these, sodium naphthalenesulfonate formalin condensates are preferably used.

The sodium naphthalenesulfonate formalin condensates preferably include dimeric, trimeric and tetrameric naphthalenesulfonate in an amount of from 20 to 80% by weight such that the resultant ink has good viscosity and dispersibility, and improves in storage stability, which prevents the nozzle from clogging.

<Hydrosoluble Organic Solvent>

The hydrosoluble organic solvent has at least an effect of a wetter or s penetrant.

Specific examples thereof include, but are not limited to, polyols such as glycerin, ethylene glycol, diethylene glycol, isopropylidene glycerol, 1,3-butane diol, 3-methyl-1,3-butane diol, triethylene glycol, propylene glycol, dipropylene glycol, trimethylol propane, trimethylol ethane, ethylene glycol, diethylene glycol, dipropylene glycol, tripropylene glycol, tetraethylene glycol, hexylene glycol, polyethylene glycol, polypropylene glycol, 1,5-pentane diol, 1,6-hexane diol, glycerol, 1,2,6-hexane triol, 1,2,4-butane triol, 1,2,3-butane triol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether, and ethylene glycol monobenzyl ether; nitrogen-containing heterocyclic compounds such as 2-pyrolidone, N-methyl-2-pyrolidone, N-hydroxyethyl-2-pyrrolidone, 1,3-dimethyl imidazolidinone, ε-caprolactone, and γ-butyrolactone; amides such as formamide, N-methylformamide, N,N-dimethylformamide, N,N-dimethyl-β-methoxy propion amide, and N,N-dimethyl-β-butoxy propion amide; amines such as monoethanol amine, diethanol amine, triethanol amine, monoethyl amine, diethyl amine, and triethyl amine; sulfur-containing compounds such as dimethyl sulfoxide, sulfolane, and thiodiethanol; 3-ethyl-3-hydroxymethyl oxetane, propylene carbonate, and ethylene carbonate. These can be used alone or in combination.

Among these solvents, 3-ethyl-3-hydroxymethyloxetane, isopropylidene glycerol, N,N-dimethyl-P-methoxy propion amide, and N,N-dimethyl-β-butoxy propion amide are particularly preferable. These effectively prevent plain papers from curling.

In addition, 1,3-butane diol, diethylene glycol, 2,2,4-trimethyl-1. 3-pentanediol, triethyleneglycol and glycerin are effectively used to prevent defective discharge due to moisture evaporation.

Specific examples of the hydrosoluble organic solvent having penetrance more than wettability include, but are not limited to, 2-ethyl-1,3-hexanediol [solubility: 4.2%)(25°)] and 2,2,4-trimethyl-1,3-pentanediol [solubility: 2.0%)(25°)].

Specific examples of other polyol compounds include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1,2-diol.

Other penetrants can be used in combination with the above-mentioned penetrants as long as the penetrants can be dissolved in the ink, and the properties of the ink can be controlled so as to fall in the desired ranges. Specific examples thereof include alkyl or aryl ethers of polyalcohols such as diethylene glycol monophenyl ether, ethylene glycol monophenyl ether, ethylene glycol monoallyl ether, diethylene glycol monobutyl ether, propylene glycol monobutyl ether, and tetraethylene glycol chlorophenyl ether; and lower alcohols such as ethanol.

Saccharides are also preferable as other solid hydrosoluble organic materials.

Specific examples of the saccharides include, but are not limited to, monosaccharides, disaccharides, oligosaccharides (including trisaccharides and tetrasaccharides), and polysaccharides. Specific examples thereof include, but are not limited to, glucose, mannose, fructose, ribose, xylose, arabinose, galactose, maltose, cellobiose, lactose, saccharose, trehalose, and maltotriose. Polysaccharides represent sugar in a broad sense and are materials that are present widely in nature, for example, α-cyclodextrine and cellulose. In addition, specific examples of derivatives of these saccharides include, but are not limited to, reducing sugars (for example, sugar alcohols (represented by $HOCH_2(CHOH)_nCH_2OH$, where n represents an integer of from 2 to 5) of the sugar groups specified above, oxidized sugars (e.g., aldonic acid and uronic acid), amino acid, and thio acid. Among these, sugar alcohols are preferable and specific examples thereof include, but are not limited to, maltitol and sorbit.

The blend ratio of the pigment and the wetter has a large impact on the discharging stability of ink injected from a head. If the blending amount of the wetter is too small while the ratio of the solid pigment portion is high, water evaporation around ink meniscus of nozzles tends to be accelerated, resulting in bad discharging performance.

The blending ratio of the wetter is preferably from 10 to 60% by weight and more preferably from 20 to 60% by weight based on the ink. The ink having such a content ratio is extremely good about the test for drying, preservation, and reliability.

<Other Components>

The ink of the present invention can include other components when necessary. Specific examples thereof include, but are not limited to, a dispersant, a pH adjuster, a hydrodispersible resin, an antiseptic and antifungal agent, a chelate reagent, an antirust agent, an antioxidant, an UV absorber, an oxygen absorber, and a light stabilizer.

—Surfactant—

Specific examples the surfactant include, but are not limited to, anionic surfactants, cationic surfactants, nonionic surfactants, ampholytic surfactants and fluorine-containing surfactants. Among these, the nonionic surfactants and the fluorine-containing surfactants are preferably used.

Specific examples of the anionic surfactants include, but are not limited to, alkyl allyl, alkylnaphthalene sulfonate, alkyl phosphate, alkyl sulfate, alkyl sulfonate, alkylether sulfate, alkylsulfosuccinate, alkyl ester sulfate, alkylbenzene sulfonate, alkyl diphenylether disulfonate, alkyl aryl ether phosphate, alkyl aryl ether sulfate, alkyl aryl ether ester sulfate, olefin sulfonate, alkane olefin sulfonate, polyoxyethylenealkylether phosphate, polyoxyethylenealkylether ester salt sulfate, ether carboxylate, sulfosuccinate, α-sulfofatty acid ester, fatty acid salts, condensates of higher fatty acid and amino acid, and naphthenate.

Specific examples of the cationic surfactants include, but are not limited to, alkylamine salts, dialkylamine salts, aliphatic amine salts, benzalkonium salts, quaternary ammonium salts, alkyl pyridinium slats, imidazolinium salts, sulfonium salts, and phosphonium salts.

Specific examples of the nonionic surfactants include, but are not limited to, acetylene glycol surfactants, polyoxyethylenealkylether, polyoxyethylenealkylphenylether, polyoxyethylenealkylester, and polyoxyethylene sorbitan fatty acid ester.

Specific examples of the ampholytic surfactants include, but are not limited to, imidazoline derivatives such as imidazolinium betaine, dimethyl alkyl lauryl betaine, alkyl glycine, and alkyl di(aminoethyl)glycin.

Specific examples of the fluorine-containing surfactants include, but are not limited to, surfactants having the following formulae (I) to (III):

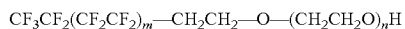

wherein each of m represents 0 or an integer of from 1 to 10 and n represents 0 or an integer of from 1 to 40.

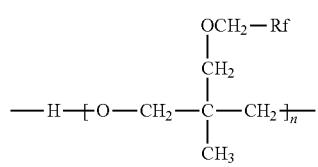

wherein Rf represents a fluorine-containing group; m, n and p represent integers of from 6 to 25, 1 to 4 and 1 to 4, respectively.

The fluorine containing group is preferably a perfluoroalkyl group. The perfluoroalkyl group preferably has 1 to 10, and more preferably 1 to 3 carbon atoms. Specific examples thereof include, but are not limited to, $-C_nF_{2n-1}$ (n is an integer of from 1 to 10) such as $-CF_3$, $-CF_2CF_3$, $-C_3F_7$ and $-C_4F_9$. Among these, $-CF_3$ and $-CF_2CF_3$ are preferable.

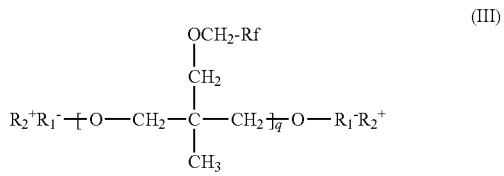

wherein Rf represents a fluorine-containing group; $R_2^+$ represents a cationic group; $R_1$ represents an anionic group; and q is an integer of form 1 to 6.

The fluorine containing group is preferably a perfluoroalkyl group such as $-CF_3$, $-CF_2CF_3$, $-C_3F_7$ and $-C_4F_9$. Specific examples of the cationic group include, but are not limited to, a quaternary ammonium group, alkali metal ions such as sodium and potassium, triethylamine and triethanolamine. Among these, the quaternary ammonium group is preferable. Specific examples of the anionic group include, but are not limited to, $COO^-$, $SO_3^-$, $SO_4^-$ and $PO_4^-$.

The ink preferably includes the surfactant in an amount of, but are not limited to, from 0.01 to 5.0% by weight, and more preferably from 0.5 to 3% by weight. When not greater than 5.0% by weight, deterioration of the image density and penetration of the ink through a substrate are prevented.

—pH Adjuster—

The pH adjuster is not particularly limited as long as it may adjust a pH of the aqueous ink being prepared to 8.5 to 11 without adversely affecting the ink. Specific examples of the pH adjuster include, but are not limited to, alcohol amines, hydroxides of an alkali metal element, hydroxides of ammonium, hydroxides of phosphonium, and carbonates of an alkali metal.

Specific examples the alcohol amines include, but are not limited to, diethanolamine, triethanolamine, and 2-amino-2-ethyl-1,3-propanediol.

Specific examples the hydroxides of an alkali metal element include, but are not limited to, lithium hydroxide, sodium hydroxide and potassium hydroxide.

Specific examples of the hydroxides of ammonium include, but are not limited to, ammonium hydroxide and quaternary ammonium hydroxide.

Specific examples of the hydroxides of phosphonium include, but are not limited to, quaternary phosphonium hydroxide.

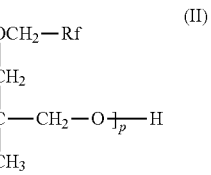

Specific examples of the carbonates of an alkali metal include, but are not limited to, lithium carbonate, sodium carbonate and potassium carbonate.

—Hydrodispersible Resin—

The hydrodispersible resin preferably has good film formability (image formability), high repellency and high weatherablity to form an image having high repellency and high image density (high colorability).

Specific examples of the hydrodispersible resin include, but are not limited to, condensed synthetic resins such as polyester resins, polyurethane resins, epoxy resins, polyamide resins, polyether resins, (meth)acrylic resins, acrylic-silicone resins and fluorine-containing resins; additional synthetic resins such as polyolefin, polystyrene resins, polyvinylalcohol resins, polyvinyl ester resins, polyacrylic resins and unsaturated carboxylic resins; and natural polymers such as celluloses, rosins and natural rubbers.

Among these, polyurethane resin fine particles, acrylic-silicone resin fine particles and fluorine-containing resin fine particles are preferably used.

An average particle diameter (D50) of the hydrodispersible resin is related with a viscosity of a dispersion liquid. The smaller the particle diameter, the larger the viscosity when the composition is the same. The average particle diameter (D50) of the hydrodispersible resin is preferably not less than 50 nm so that the ink may not have too high a viscosity. When the particle diameter is some ten μm, the resin cannot be used because of being larger than the nozzle of inkjet head. Even when smaller than the nozzle, the large-size particles in the ink deteriorates discharge stability thereof. Therefore, the average particle diameter (D50) of the hydrodispersible resin is more preferably not greater than 200 nm so as not to impair discharge stability of the ink.

The hydrodispersible resin preferably fixes a pigment dispersion on a paper and films it at normal temperature to improve fixability of the pigment.

Therefore, the hydrodispersible resin preferably has a minimum filming temperature (MFT) not greater than 30° C.

The hydrodispersible resin preferably has a glass transition temperature not less than −30° C. because the resin film has higher viscosity otherwise, which causes tack of the printed matter.

The ink preferably includes the hydrodispersible resin in an amount of from 1 to 15% by weight, and more preferably from 2 to 7% by weight.

—Antiseptic and Antifungal Agent—

Specific examples the antiseptic and antifungal agent include, but are not limited to, sodium dehydroacetate, sodium sorbate, 2-pyridinethiol 1-oxide sodium, sodium benzoate, and sodium pentachlorophenol.

—Antirust Agent—

Specific examples the antirust agent include, but are not limited to, acid sulfite, sodium thiosulfate, ammonium thiodiglycolate, diisopropyl ammonium nitrite, pentaerythritol tetranitrate, and dicyclohexylammonium nitrite.

—Antioxidant—

Specific examples of the antioxidant include, but are not limited to, a phenol-based antioxidant (including a hindered phenol-based antioxidant), an amine-based antioxidant, a sulfur-based antioxidant, and a phosphorus-based antioxidant.

—UV Absorber—

Specific examples of the UV absorber include, but are not limited to, a benzophenone-based UV absorber, a benzotriazole UV absorber, a salicylate-based UV absorber, a cyanoacrylate-based UV absorber, and a nickel complex salt-based UV absorber.

<Method of Preparing Ink for Inkjet Recording>

A method of preparing the ink for inkjet recording of the present invention includes dispersing or dissolving water, a hydrosoluble organic solvent, a pigment, the polymer Q, and other optional components in an aqueous medium to prepare a mixture; and stirring the mixture.

The ink is preferably filtered to remove coarse particles by a filter or a centrifugal separator and deaerated when necessary.

Dispersion can be made by using a sand mill, a homogenizer, a ball mill, a paint shaker, an ultrasonic disperser, and the stirring and mixing can be made by using ordinary stirring blades, a magnetic stirrer, and a high-speed disperser, for example.

<Ink Properties>

Physical properties of the ink of the present invention are not particularly limited and may be appropriately selected according to purpose.

A viscosity of the aqueous ink at 25° C. is preferably 3 to 20 mPa·s. An effect of improved print density and letter quality may be obtained with the viscosity being 3 mPa·s or greater. At the same time, discharge property may be ensured with the viscosity suppressed to 20 mPa·s or less. The viscosity is measured by a viscometer RE-500L from Toki Sangyo Co., Ltd. at 25° C.

The ink preferably has a surface tension not greater than 40 mN/m at 25° C.

<Ink Container>

The ink container of the present invention contains the inkjet ink of the present invention and may include any other suitable members in combination. There is no specific limit to the container. Any form, any structure, any size, and any material can be suitably selected. For example, an ink bag formed of aluminum laminate film, a resin film, etc. can be suitably used as a container.

Figure 2:
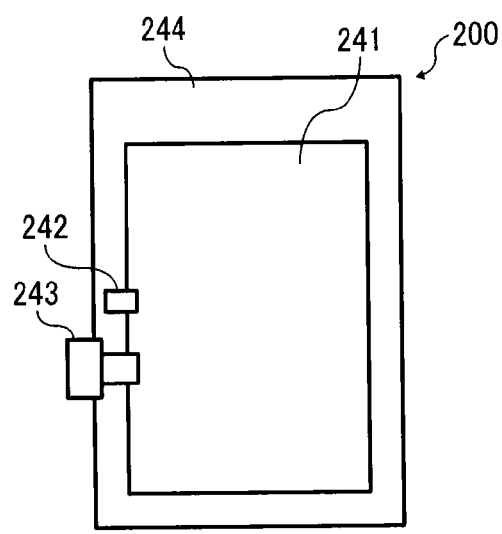
FIG. 2 is a schematic view illustrating the ink container of the present invention including a case in FIG. 1.

FIG. 1 is a schematic plain view illustrating an embodiment of the ink container 200 of the present invention. FIG. 2 is a schematic plain view illustrating the embodiment of the ink container 200 including a case (outer package) in FIG. 1.

As illustrated in FIG. 1, an ink bag 241 is filled with the ink from an ink inlet 242. Subsequent to evacuation of air, the ink inlet 242 is closed by fusion. When in use, the ink is supplied by piercing the needle attached to the inkjet recorder into an ink outlet 243 made of rubber. The ink bag 241 is formed of a packaging material such as aluminum laminate film having no air permeability. The ink bag 241 is accommodated in a cartridge case 244 made of plastic and detachably attached to various inkjet recorders.

(Inkjet Recorder and Inkjet Recording Method)

The inkjet recorder of the present invention records information or an image on a recording medium with the ink of the present invention using an inkjet head. An embodiment thereof is explained, referring to the drawings.

Figure 3:
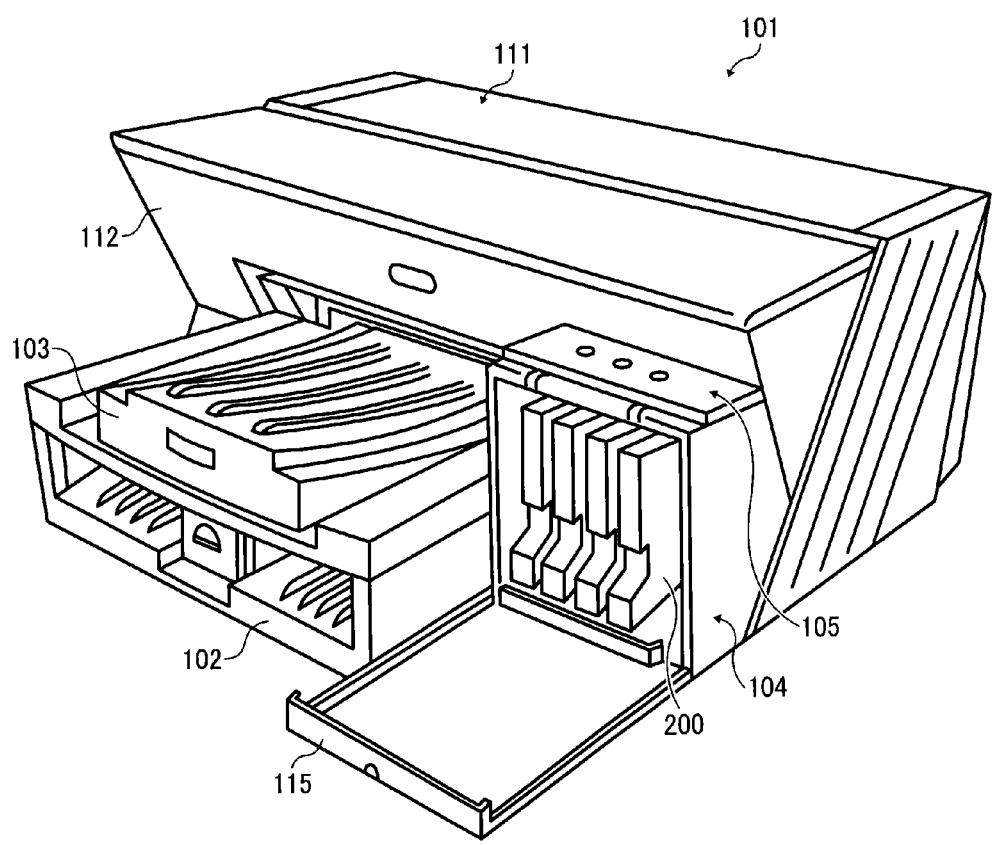
FIG. 3 is a perspective view illustrating an embodiment of the whole inkjet recorder of the present invention.

An inkjet recorder 101 illustrated in FIG. 3 has a sheet feeder tray 102 to feed recording media placed in the inkjet recorder 101, a discharging tray 103 installed in the inkjet recorder 101, which stores the recording media on which images are recorded (formed), and an ink cartridge installation unit 104. On the upper surface of the ink cartridge installation unit 104 is arranged an operating portion 105 including operation keyboard, a display, etc. The ink cartridge installation unit 104 has a front cover 115 that is openable and closable to detach and attach an ink container 200. 111 represents the upper cover of the inkjet recorder 101 and 112 represents the front surface thereof.

Figure 4:
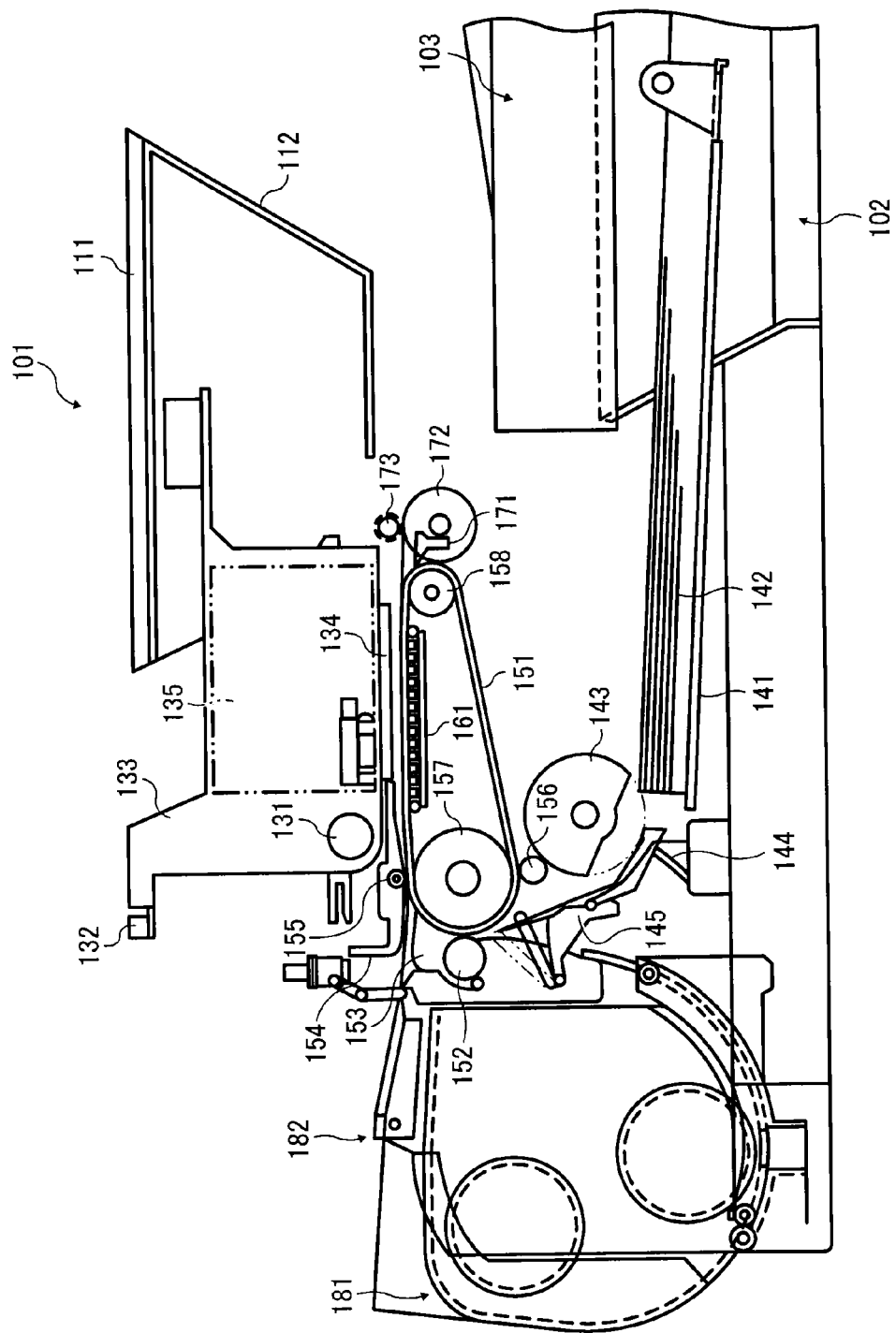
FIG. 4 is a schematic view illustrating an inner structure of an embodiment of the inkjet recorder of the present invention.
Figure 5:
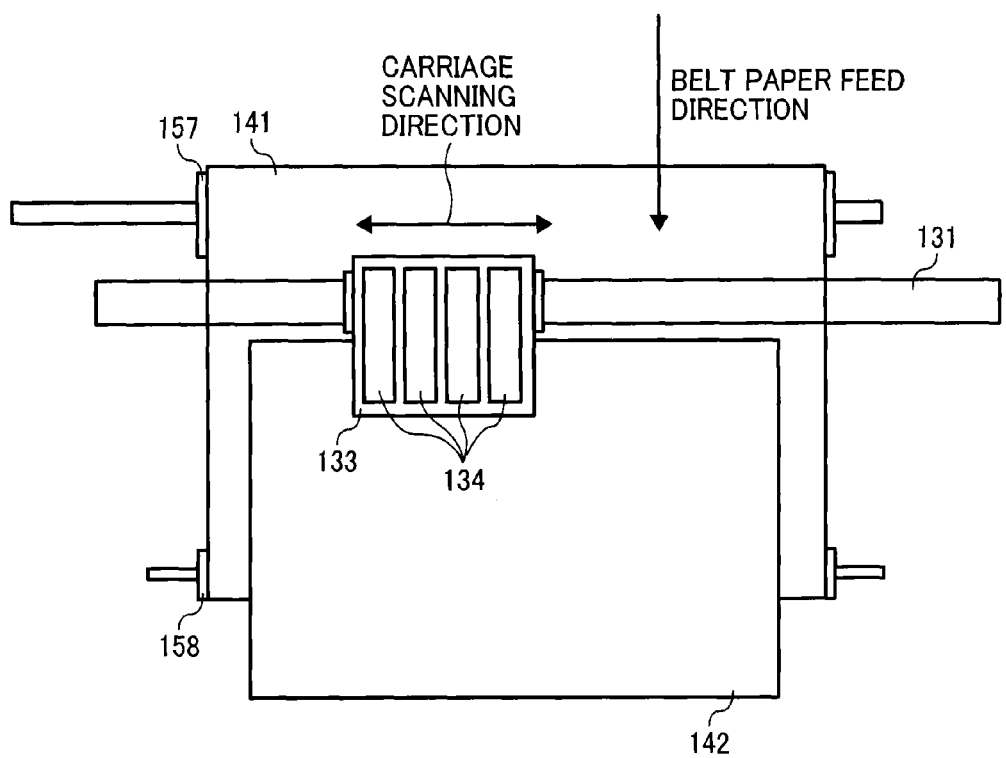
FIG. 5 is a schematic view illustrating an embodiment of inkjet head of the inkjet recorder of the present invention.

Inside the inkjet recorder 101, as illustrated in FIGS. 4 and 5, a guide rod 131 and a stay 132 serving as guiding members that laterally bridge side plates provided on the right side and left side hold a carriage 133 slidably movable in the main scanning direction. A main scanning motor moves the carriage 133 for scanning in an arrow direction in FIG. 5. The carriage 133 has a recording head 134 having four inkjet recording heads that discharge ink droplets of each color of yellow (Y), cyan (C), magenta (M), and black (Bk) while multiple ink discharging mouths are arranged in the direction crossing the main scanning direction with the ink droplet discharging direction downward.

As the heads for inkjet recording that form the recording head 134, it is possible to use a device having an energy-generating device to discharge ink such as a piezoelectric actuator such as a piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force.

The carriage 133 has a sub tank 135 for each color to supply each color ink to the recording head 134. The ink is supplied and replenished to the sub-tank 135 from the ink container 200 mounted onto the ink cartridge inserting installation unit 104 via a tube for supplying ink.

A sheet feeding unit to feed a sheet 142 loaded on a sheet loader (pressure plate) 141 of the sheet feeder tray 103 includes a roller (sheet feeding roller 143) having a half-moon like form to separate and feed the sheet 142 one by one from the sheet loader 141 and a separation pad 144 that is made of a material having a large friction index and arranged facing the sheet feeding roller 143 while biased to the side of the sheet feeding roller 143.

A transfer unit to transfer the sheet 142 fed from the sheet feeding unit on the lower side of the recording head 134 includes a transfer belt 151 to electrostatically adsorb and transfer the sheet 142, a counter roller 152 to transfer the sheet 142 fed from the sheet feeding unit via a guide 145 while pinching the sheet 142 with the transfer belt 151, a transfer guide 153 to make the sheet 142 track on the transfer belt 151 by changing the transfer direction of the sheet 142 being sent substantially vertically upward by substantially 90°, a front head pressure roller 155 biased towards the transfer belt 151 by a pressure member 154, and a charging roller 156 to charge the surface of the transfer belt 151.

The transfer belt 151 is an endless form belt, stretched between a transfer roller 157 and a tension roller 158 and rotatable in the belt transfer direction. This transfer belt 151 include, for example, a top layer serving as a sheet adsorption surface made of a resin material such as a copolymer (ETFE) of tetrafluoroethylene and ethylene with no resistance control treatment while having a thickness about 40 μm, and a bottom layer (moderate resistance layer, earth layer) made of the same material as the top layer with resistance control treatment with carbon. On the rear side of the transfer belt 151, a guiding member 161 is arranged corresponding to the printing area by the recording head 134. A discharging unit to discharge the sheet 142 on which images are recorded by the recording head 134 includes a separation claw 171 to separate the sheet 142 from the transfer belt 151, a discharging roller 172, and a discharging roller 173. A discharging tray 103 is arranged below the discharging roller 172.

A duplex printing sheet feeding unit 181 is detachably attached to the rear side of the inkjet recorder 101. The duplex printing sheet feeding unit 181 takes in and reverses the sheet 142 that is returned by the reverse rotation of the transfer belt 151 and feeds it again between the counter roller 152 and the transfer belt 151. A manual sheet feeding unit 182 is provided on the upper surface of the duplex printing sheet feeding unit 181.

In this inkjet recorder, the sheet 142 is separated and fed from the sheet feeding unit one by one substantially vertically upward, guided by the guide 145, and transferred while being pinched between the transfer belt 151 and the counter roller 152. Furthermore, the front end of the sheet 142 is guided by the transfer guide 153 and pressed against the transfer belt 151 by the front head pressure roller 155 to change the transfer direction by substantially 90°.

Since the transfer belt 151 is charged by the charging roller 156 at this point in time, the sheet 142 is electrostatically adsorbed to the transfer belt 151 and transferred. By driving the recording head 134 according to the image signal while moving the carriage 133, the ink droplet is discharged to the sheet 142 not in motion to record an image for an amount corresponding to one line and thereafter the sheet 142 is transferred in a predetermined amount to conduct recording for the next line. On receiving a signal indicating that the recording has completed or the rear end of the sheet 142 has reached the image recording area, the recording operation stops and the sheet 142 is discharged to the discharging tray 103.

When the amount of ink for inkjet recording remaining in the sub-tank 135 is detected as "approaching to empty", a predetermined amount of the ink is replenished to the sub tank 135 from the ink container 200.

In this inkjet recorder, it is possible to dissemble the chassis of the ink container 200 and replace the ink bags therein when the ink for inkjet is used up in the ink container 200. In addition, the ink cartridge 200 stably supplies the ink even when the ink cartridge 200 is placed upright (on its side) and installed by front loading. Therefore, even when the upside of the main part 101 is blocked, for example, it is accommodated in a rack or something is placed on the upper surface of the main part 101, the ink cartridge 200 is easily exchanged.

A serial type (shuttle type) in which the carriage scans is used in this description but this is true in a line-type inkjet recorder having a line type head.

The inkjet recorder is applicable to various inkjet recordings such as inkjet recording printers, facsimiles, copiers and their combination machines.

(Recorded Matter)

The recorded matter of the present invention is a recorded matter which is a recording medium information or images are recorded on with the ink of the present invention, and is prepared by discharging the ink of the present invention from an inkjet head to record on the recording medium.

The recorded matter of the present invention has high-quality images without bleeding, and good stability preferably usable for various applications.

Specific examples of recording media recorded by the inkjet recorder include, but are not limited to, plain papers, coated papers for printing, glossy papers, special papers, clothes, films and OHP sheets.

Among these, the plain papers and the coated papers for printing are preferably used. The plain paper has an advantage of being inexpensive. The coated paper for printing has an advantage of being less expensive than the glossy paper providing smooth and glossy images. The plain papers and the coated papers for printing have poor dryability and have been difficult to use for inkjet, but have improved in dryability and can be used with the ink of the present invention.

The ink of the present invention is effectively used on a paper eluting Ca ion in an amount of from $1.0 \times 10^{-4}$ to $5.0 \times 10^{-4}$ g/g. When less than $1.0 \times 10^{-4}$ g/g, improvement of the image density due to reaction agglomeration with the pigment dispersant deteriorates. When greater than $5.0 \times 10^{-4}$ g/g, an ink noticeably becomes difficult to penetrate a paper and poorly dried, resulting in deterioration of scratch resistance and marker resistance.

Ca ion amount eluted from a paper is calculated by the following method.

Namely, a paper is cut to paper slips of 2.5 cm (±0.5 cm)×3.5 cm (±0.5 cm), and 16 g thereof are dipped in 200 g of high-purity water (25° C.) for 40 hrs. The high-purity water after the paper slips are dipped therein is filtered with a 0.8 cellulose acetate filter (from Advantech Co., Ltd.) to remove foreign particles such as paper dusts, and Ca ion included therein is determined by an ICP emission spectrometer. The resultant Ca ion concentration [ppm] is multiplied by 200 g which is the weight of the high-purity water, and further divided by 16 g which is the weight of the paper dipped to determine an amount of Ca ion [g/g] eluted from the paper.

For example, My Paper from Ricoh Company, Ltd. includes Ca ion in an amount of $4.3 \times 10^{-4}$ g/g, and Xerox 4024 from Fuji Xerox Co, Ltd. includes Ca ion in an amount of $1.7 \times 10^{-4}$ g/g.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

<Measurement of Weight-Average Molecular Weight of Polymer>

GPC method was used with a column constant temperature reservoir CTO-20A from Shimadzu Corp., a detector RID-10A from Shimadzu Corp., an eluent duct pump LC-20AD from Shimadzu Corp., a degasser DGU-20A from Shimadzu Corp., and an auto-sampler SIL-20A from Shimadzu Corp.

Aqueous SEC columns TSKge13000PWXL (elimination limit molecular weight 2×105), TSKge15000PWXL (elimination limit molecular weight 2.5×106) and TSKge16000PWXL (elimination limit molecular weight 5×107) from Tosoh Corp. were connected with each other to form the column. A sample was placed in an eluent to have a concentration of 2 g/100 mL. An aqueous solution including an acetic acid and sodium acetate having 0.5 mol/litter, respectively was used as the eluent. The column had a temperature of 40° C. and a flow velocity was 1.0 mL/min.

As standard samples, 9 polyethylene glycols having molecular weights of 1065, 5050, 24000, 50000, 107000, 140000, 250000, 540000 and 920000, respectively were used to determine a calibration curve. Based on the calibration curve, a weight-average molecular weight of the copolymer was measured.

<Synthesis of Polymer>

The following polymers 1 to 31 were prepared. Constituents, contents thereof, a weight-average molecular weight, and M in the formula (1) of each of the polymers are shown in Table 1.

Synthesis Example 1

Synthesis of Polymer 1

A flask equipped with a stirrer, a thermometer and a nitrogen gas introduction pipe was charged with 500.0 parts of a solvent (ethanol), 30.0 parts of 1-methacryloxyethane-1,1-diphosphonic acid represented by the formula (11), 70.0 parts of benzylacrylate represented by the formula (18) and 4.0 parts of a polymerization initiator (azobisisobutylonitrile), and the mixture was heated to have a temperature of 65° C. Next, after the mixture was polymerized for 15 hrs under a nitrogen stream, about a half of the solvent in the reactant was removed. The resultant reactant was injected in acetone to extract a polymer, and the polymer is further dried to prepare a polymer 1. Potassium hydroxide was added to the polymer 1 while diluted with water to obtain an aqueous solution thereof, in which the phosphonic acid groups were neutralized by 100%. The polymer 1 had a weight-average molecular weight of 31,000.

Synthesis Example 2

Synthesis of Polymer 2

A flask equipped with a stirrer, a thermometer and a nitrogen gas introduction pipe was charged with 500.0 parts of a solvent (ethanol), 30.0 parts of 1-acryloxyethane-1,1-diphosphonic acid represented by the formula (12), 70.0 parts of benzylacrylate and 4.0 parts of a polymerization initiator (azobisisobutylonitrile), and the mixture was heated to have a temperature of 65° C. Next, after the mixture was polymerized for 15 hrs under a nitrogen stream, about a half of the solvent in the reactant was removed. The resultant reactant was injected in acetone to extract a polymer, and the polymer is further dried to prepare a polymer 2. Potassium hydroxide was added to the polymer 2 while diluted with water to obtain an aqueous solution thereof, in which the phosphonic acid groups were neutralized by 100%. The polymer 2 had a weight-average molecular weight of 28,000.

Synthesis Example 3

Synthesis of Polymer 3

A flask equipped with a stirrer, a thermometer and a nitrogen gas introduction pipe was charged with 500.0 parts of a solvent (ethanol), 30.0 parts of 1-methacryloxyethane-1,1-diphosphonic acid, 70.0 parts of benzyl methacrylate represented by the formula (17) and 4.0 parts of a polymerization initiator (azobisisobutylonitrile), and the mixture was heated to have a temperature of 65° C. Next, after the mixture was polymerized for 15 hrs under a nitrogen stream, about a half of the solvent in the reactant was removed. The resultant reactant was injected in acetone to extract a polymer, and the polymer is further dried to prepare a polymer 3. Potassium hydroxide was added to the polymer 3 while diluted with water to obtain an aqueous solution thereof, in which the phosphonic acid groups were neutralized by 100%. The polymer 3 had a weight-average molecular weight of 31,000.

Synthesis Example 4

Synthesis of Polymer 4

A flask equipped with a stirrer, a thermometer and a nitrogen gas introduction pipe was charged with 500.0 parts of a solvent (ethanol), 30.0 parts of 1-methacryloxyethane-1,1-diphosphonic acid, 70.0 parts of stearylacrylate represented by the formula (14) and 4.0 parts of a polymerization initiator (azobisisobutylonitrile), and the mixture was heated to have a temperature of 65° C. Next, after the mixture was polymerized for 15 hrs under a nitrogen stream, about a half of the solvent in the reactant was removed. The resultant reactant was injected in acetone to extract a polymer, and the polymer is further dried to prepare a polymer 4. Potassium hydroxide was added to the polymer 4 while diluted with water to obtain an aqueous solution thereof, in which the phosphonic acid groups were neutralized by 100%. The polymer 4 had a weight-average molecular weight of 32,000.

Synthesis Example 5

Synthesis of Polymer 5

A flask equipped with a stirrer, a thermometer and a nitrogen gas introduction pipe was charged with 500.0 parts of a solvent (ethanol), 30.0 parts of 1-acryloxyethane-1,1-diphosphonic acid, 70.0 parts of stearylacrylate and 4.0 parts of a polymerization initiator (azobisisobutylonitrile), and the mixture was heated to have a temperature of 65° C. Next, after the mixture was polymerized for 15 hrs under a nitrogen stream, about a half of the solvent in the reactant was removed. The resultant reactant was injected in acetone to extract a polymer, and the polymer is further dried to prepare a polymer 5. Potassium hydroxide was added to the polymer 5 while diluted with water to obtain an aqueous solution thereof, in which the phosphonic acid groups were neutralized by 100%. The polymer 5 had a weight-average molecular weight of 33,000.

Synthesis Example 6

Synthesis of Polymer 6

A flask equipped with a stirrer, a thermometer and a nitrogen gas introduction pipe was charged with 500.0 parts of a solvent (ethanol), 30.0 parts of 1-methacryloxyethane-1,1-diphosphonic acid, 70.0 parts of stearylmethacrylate represented by the formula (13) and 4.0 parts of a polymerization initiator (azobisisobutylonitrile), and the mixture was heated to have a temperature of 65° C. Next, after the mixture was polymerized for 15 hrs under a nitrogen stream, about a half of the solvent in the reactant was removed. The resultant reactant was injected in acetone to extract a polymer, and the polymer is further dried to prepare a polymer 6. Potassium hydroxide was added to the polymer 6 while diluted with water to obtain an aqueous solution thereof, in which the phosphonic acid groups were neutralized by 100%. The polymer 6 had a weight-average molecular weight of 32,000.

Synthesis Example 7

Synthesis of Polymer 7

A flask equipped with a stirrer, a thermometer and a nitrogen gas introduction pipe was charged with 500.0 parts of a solvent (ethanol), 30.0 parts of 1-methacryloxyethane-1,1-diphosphonic acid, 70.0 parts of benzylacrylate and 4.0 parts of a polymerization initiator (azobisisobutylonitrile), and the mixture was heated to have a temperature of 65° C. Next, after the mixture was polymerized for 15 hrs under a nitrogen stream, about a half of the solvent in the reactant was removed. The resultant reactant was injected in acetone to extract a polymer, and the polymer is further dried to prepare a polymer 7. Potassium hydroxide was added to the polymer 7 while diluted with water to obtain an aqueous solution thereof, in which the phosphonic acid groups were neutralized by 50%. The polymer 7 had a weight-average molecular weight of 30,000.

Synthesis Example 8

Synthesis of Polymer 8

A flask equipped with a stirrer, a thermometer and a nitrogen gas introduction pipe was charged with 500.0 parts of a solvent (ethanol), 30.0 parts of 1-methacryloxyethane-1,1-diphosphonic acid, 70.0 parts of benzylacrylate and 4.0 parts of a polymerization initiator (azobisisobutylonitrile), and the mixture was heated to have a temperature of 65° C. Next, after the mixture was polymerized for 15 hrs under a nitrogen stream, about a half of the solvent in the reactant was removed. The resultant reactant was injected in acetone to extract a polymer, and the polymer is further dried to prepare a polymer 8. Ethanolamine was added to the polymer 8 while diluted with water to obtain an aqueous solution thereof, in which the phosphonic acid groups were neutralized by 100%. The polymer 8 had a weight-average molecular weight of 31,000.

Synthesis Example 9

Synthesis of Polymer 9

A flask equipped with a stirrer, a thermometer and a nitrogen gas introduction pipe was charged with 500.0 parts of a solvent (ethanol), 30.0 parts of 1-methacryloxyethane-1,1-diphosphonic acid, 70.0 parts of benzylacrylate and 4.0 parts of a polymerization initiator (azobisisobutylonitrile), and the mixture was heated to have a temperature of 75° C. Next, after the mixture was polymerized for 3 hrs under a nitrogen stream, about a half of the solvent in the reactant was removed. The resultant reactant was injected in acetone to extract a polymer, and the polymer is further dried to prepare a polymer 9. Potassium hydroxide was added to the polymer 9 while diluted with water to obtain an aqueous solution thereof, in which the phosphonic acid groups were neutralized by 100%. The polymer 9 had a weight-average molecular weight of 2,100.

Synthesis Example 10

Synthesis of Polymer 10

A flask equipped with a stirrer, a thermometer and a nitrogen gas introduction pipe was charged with 500.0 parts of a solvent (ethanol), 30.0 parts of 1-methacryloxyethane-1,1-diphosphonic acid, 70.0 parts of benzylacrylate and 4.0 parts of a polymerization initiator (azobisisobutylonitrile), and the mixture was heated to have a temperature of 65° C. Next, after the mixture was polymerized for 3 hrs under a nitrogen stream, about a half of the solvent in the reactant was removed. The resultant reactant was injected in acetone to extract a polymer, and the polymer is further dried to prepare a polymer 10. Potassium hydroxide was added to the polymer 10 while diluted with water to obtain an aqueous solution thereof, in which the phosphonic acid groups were neutralized by 100%. The polymer 10 had a weight-average molecular weight of 4,200.

Synthesis Example 11

Synthesis of Polymer 11

A flask equipped with a stirrer, a thermometer and a nitrogen gas introduction pipe was charged with 500.0 parts of a solvent (ethanol), 30.0 parts of 1-methacryloxyethane-1,1-diphosphonic acid, 70.0 parts of benzylacrylate and 4.0 parts of a polymerization initiator (azobisisobutylonitrile), and the mixture was heated to have a temperature of 50° C. Next, after the mixture was polymerized for 24 hrs under a nitrogen stream, about a half of the solvent in the reactant was removed. The resultant reactant was injected in acetone to extract a polymer, and the polymer is further dried to prepare a polymer 11. Potassium hydroxide was added to the polymer 11 while diluted with water to obtain an aqueous solution thereof, in which the phosphonic acid groups were neutralized by 100%. The polymer 11 had a weight-average molecular weight of 50,000.

Synthesis Example 12

Synthesis of Polymer 12

A flask equipped with a stirrer, a thermometer and a nitrogen gas introduction pipe was charged with 500.0 parts of a solvent (ethanol), 30.0 parts of 1-methacryloxyethane-1,1-diphosphonic acid, 70.0 parts of benzylacrylate and 4.0 parts of a polymerization initiator (azobisisobutylonitrile), and the mixture was heated to have a temperature of 50° C. Next, after the mixture was polymerized for 48 hrs under a nitrogen stream, about a half of the solvent in the reactant was removed. The resultant reactant was injected in acetone to extract a polymer, and the polymer is further dried to prepare a polymer 12. Potassium hydroxide was added to the polymer 12 while diluted with water to obtain an aqueous solution thereof, in which the phosphonic acid groups were neutralized by 100%. The polymer 12 had a weight-average molecular weight of 70,000.

Synthesis Example 13

Synthesis of Polymer 13

A flask equipped with a stirrer, a thermometer and a nitrogen gas introduction pipe was charged with 500.0 parts of a solvent (ethanol), 5.0 parts of 1-methacryloxyethane-1,1-diphosphonic acid, 95.0 parts of benzylacrylate and 4.0 parts of a polymerization initiator (azobisisobutylonitrile), and the mixture was heated to have a temperature of 75° C. Next, after the mixture was polymerized for 3 hrs under a nitrogen stream, about a half of the solvent in the reactant was removed. The resultant reactant was injected in acetone to extract a polymer, and the polymer is further dried to prepare a polymer 13. Potassium hydroxide was added to the polymer 13 while diluted with water to obtain an aqueous solution thereof, in which the phosphonic acid groups were neutralized by 100%. The polymer 13 had a weight-average molecular weight of 2,000.

Synthesis Example 14

Synthesis of Polymer 14

A flask equipped with a stirrer, a thermometer and a nitrogen gas introduction pipe was charged with 500.0 parts of a solvent (ethanol), 5.0 parts of 1-methacryloxyethane-1,1-diphosphonic acid, 95.0 parts of benzylacrylate and 4.0 parts of a polymerization initiator (azobisisobutylonitrile), and the mixture was heated to have a temperature of 65° C. Next, after the mixture was polymerized for 5 hrs under a nitrogen stream, about a half of the solvent in the reactant was removed. The resultant reactant was injected in acetone to extract a polymer, and the polymer is further dried to prepare a polymer 14. Potassium hydroxide was added to the polymer 14 while diluted with water to obtain an aqueous solution thereof, in which the phosphonic acid groups were neutralized by 100%. The polymer 14 had a weight-average molecular weight of 2,000.

Synthesis Example 15

Synthesis of Polymer 15

A flask equipped with a stirrer, a thermometer and a nitrogen gas introduction pipe was charged with 500.0 parts of a solvent (ethanol), 5.0 parts of 1-methacryloxyethane-1,1-diphosphonic acid, 95.0 parts of benzylacrylate and 4.0 parts of a polymerization initiator (azobisisobutylonitrile), and the mixture was heated to have a temperature of 50° C. Next, after the mixture was polymerized for 24 hrs under a nitrogen stream, about a half of the solvent in the reactant was removed. The resultant reactant was injected in acetone to extract a polymer, and the polymer is further dried to prepare a polymer 15. Potassium hydroxide was added to the polymer 15 while diluted with water to obtain an aqueous solution thereof, in which the phosphonic acid groups were neutralized by 100%. The polymer 15 had a weight-average molecular weight of 49,000.

Synthesis Example 16

Synthesis of Polymer 16

A flask equipped with a stirrer, a thermometer and a nitrogen gas introduction pipe was charged with 500.0 parts of a solvent (ethanol), 5.0 parts of 1-methacryloxyethane-1,1-diphosphonic acid, 95.0 parts of benzylacrylate and 4.0 parts of a polymerization initiator (azobisisobutylonitrile), and the mixture was heated to have a temperature of 50° C. Next, after the mixture was polymerized for 48 hrs under a nitrogen stream, about a half of the solvent in the reactant was removed. The resultant reactant was injected in acetone to extract a polymer, and the polymer is further dried to prepare a polymer 16. Potassium hydroxide was added to the polymer 16 while diluted with water to obtain an aqueous solution thereof, in which the phosphonic acid groups were neutralized by 100%. The polymer 16 had a weight-average molecular weight of 69,000.

Synthesis Example 17

Synthesis of Polymer 17

A flask equipped with a stirrer, a thermometer and a nitrogen gas introduction pipe was charged with 500.0 parts of a solvent (ethanol), 10.0 parts of 1-methacryloxyethane-1,1-diphosphonic acid, 90.0 parts of benzylacrylate and 4.0 parts of a polymerization initiator (azobisisobutylonitrile), and the mixture was heated to have a temperature of 75° C. Next, after the mixture was polymerized for 3 hrs under a nitrogen stream, about a half of the solvent in the reactant was removed. The resultant reactant was injected in acetone to extract a polymer, and the polymer is further dried to prepare a polymer 17. Potassium hydroxide was added to the polymer 17 while diluted with water to obtain an aqueous solution thereof, in which the phosphonic acid groups were neutralized by 100%. The polymer 17 had a weight-average molecular weight of 2,200.

Synthesis Example 18

Synthesis of Polymer 18

A flask equipped with a stirrer, a thermometer and a nitrogen gas introduction pipe was charged with 500.0 parts of a solvent (ethanol), 10.0 parts of 1-methacryloxyethane-1, 1-diphosphonic acid, 90.0 parts of benzylacrylate and 4.0 parts of a polymerization initiator (azobisisobutylonitrile), and the mixture was heated to have a temperature of 65° C. Next, after the mixture was polymerized for 3 hrs under a nitrogen stream, about a half of the solvent in the reactant was removed. The resultant reactant was injected in acetone to extract a polymer, and the polymer is further dried to prepare a polymer 18. Potassium hydroxide was added to the polymer 18 while diluted with water to obtain an aqueous solution thereof, in which the phosphonic acid groups were neutralized by 100%. The polymer 18 had a weight-average molecular weight of 4,300.

Synthesis Example 19

Synthesis of Polymer 19

A flask equipped with a stirrer, a thermometer and a nitrogen gas introduction pipe was charged with 500.0 parts of a solvent (ethanol), 10.0 parts of 1-methacryloxyethane-1,1-diphosphonic acid, 90.0 parts of benzylacrylate and 4.0 parts of a polymerization initiator (azobisisobutylonitrile), and the mixture was heated to have a temperature of 50° C. Next, after the mixture was polymerized for 24 hrs under a nitrogen stream, about a half of the solvent in the reactant was removed. The resultant reactant was injected in acetone to extract a polymer, and the polymer is further dried to prepare a polymer 19. Potassium hydroxide was added to the polymer 19 while diluted with water to obtain an aqueous solution thereof, in which the phosphonic acid groups were neutralized by 100%. The polymer 19 had a weight-average molecular weight of 50,000.

Synthesis Example 20

Synthesis of Polymer 20

A flask equipped with a stirrer, a thermometer and a nitrogen gas introduction pipe was charged with 500.0 parts of a solvent (ethanol), 10.0 parts of 1-methacryloxyethane-1,1-diphosphonic acid, 90.0 parts of benzylacrylate and 4.0 parts of a polymerization initiator (azobisisobutylonitrile), and the mixture was heated to have a temperature of 50° C. Next, after the mixture was polymerized for 48 hrs under a nitrogen stream, about a half of the solvent in the reactant was removed. The resultant reactant was injected in acetone to extract a polymer, and the polymer is further dried to prepare a polymer 20. Potassium hydroxide was added to the polymer 20 while diluted with water to obtain an aqueous solution thereof, in which the phosphonic acid groups were neutralized by 100%. The polymer 20 had a weight-average molecular weight of 68,000.

Synthesis Example 21

Synthesis of Polymer 21

A flask equipped with a stirrer, a thermometer and a nitrogen gas introduction pipe was charged with 500.0 parts of a solvent (ethanol), 60.0 parts of 1-methacryloxyethane-1,1-diphosphonic acid, 40.0 parts of benzylacrylate and 4.0 parts of a polymerization initiator (azobisisobutylonitrile), and the mixture was heated to have a temperature of 75° C. Next, after the mixture was polymerized for 3 hrs under a nitrogen stream, about a half of the solvent in the reactant was removed. The resultant reactant was injected in acetone to extract a polymer, and the polymer is further dried to prepare a polymer 21. Potassium hydroxide was added to the polymer 21 while diluted with water to obtain an aqueous solution thereof, in which the phosphonic acid groups were neutralized by 100%. The polymer 21 had a weight-average molecular weight of 68,000.

Synthesis Example 22

Synthesis of Polymer 22

A flask equipped with a stirrer, a thermometer and a nitrogen gas introduction pipe was charged with 500.0 parts of a solvent (ethanol), 60.0 parts of 1-methacryloxyethane-1,1-diphosphonic acid, 40.0 parts of benzylacrylate and 4.0 parts of a polymerization initiator (azobisisobutylonitrile), and the mixture was heated to have a temperature of 65° C. Next, after the mixture was polymerized for 3 hrs under a nitrogen stream, about a half of the solvent in the reactant was removed. The resultant reactant was injected in acetone to extract a polymer, and the polymer is further dried to prepare a polymer 22. Potassium hydroxide was added to the polymer 22 while diluted with water to obtain an aqueous solution thereof, in which the phosphonic acid groups were neutralized by 100%. The polymer 22 had a weight-average molecular weight of 4,000.

Synthesis Example 23

Synthesis of Polymer 23

A flask equipped with a stirrer, a thermometer and a nitrogen gas introduction pipe was charged with 500.0 parts of a solvent (ethanol), 60.0 parts of 1-methacryloxyethane-1,1-diphosphonic acid, 40.0 parts of benzylacrylate and 4.0 parts of a polymerization initiator (azobisisobutylonitrile), and the mixture was heated to have a temperature of 50° C. Next, after the mixture was polymerized for 24 hrs under a nitrogen stream, about a half of the solvent in the reactant was removed. The resultant reactant was injected in acetone to extract a polymer, and the polymer is further dried to prepare a polymer 23. Potassium hydroxide was added to the polymer 23 while diluted with water to obtain an aqueous solution thereof, in which the phosphonic acid groups were neutralized by 100%. The polymer 23 had a weight-average molecular weight of 48,000.

Synthesis Example 24

Synthesis of Polymer 24

A flask equipped with a stirrer, a thermometer and a nitrogen gas introduction pipe was charged with 500.0 parts of a solvent (ethanol), 60.0 parts of 1-methacryloxyethane-1,1-diphosphonic acid, 40.0 parts of benzylacrylate and 4.0 parts of a polymerization initiator (azobisisobutylonitrile), and the mixture was heated to have a temperature of 50° C. Next, after the mixture was polymerized for 48 hrs under a nitrogen stream, about a half of the solvent in the reactant was removed. The resultant reactant was injected in acetone to extract a polymer, and the polymer is further dried to prepare a polymer 24. Potassium hydroxide was added to the polymer 24 while diluted with water to obtain an aqueous solution thereof, in which the phosphonic acid groups were neutralized by 100%. The polymer 24 had a weight-average molecular weight of 70,000.

Synthesis Example 25

Synthesis of Polymer 25

A flask equipped with a stirrer, a thermometer and a nitrogen gas introduction pipe was charged with 500.0 parts of a solvent (ethanol), 80.0 parts of 1-methacryloxyethane-1,1-diphosphonic acid, 20.0 parts of benzylacrylate and 4.0 parts of a polymerization initiator (azobisisobutylonitrile), and the mixture was heated to have a temperature of 75° C. Next, after the mixture was polymerized for 3 hrs under a nitrogen stream, about a half of the solvent in the reactant was removed. The resultant reactant was injected in acetone to extract a polymer, and the polymer is further dried to prepare a polymer 25. Potassium hydroxide was added to the polymer 25 while diluted with water to obtain an aqueous solution thereof, in which the phosphonic acid groups were neutralized by 100%. The polymer 25 had a weight-average molecular weight of 2,200.

Synthesis Example 26

Synthesis of Polymer 26

A flask equipped with a stirrer, a thermometer and a nitrogen gas introduction pipe was charged with 500.0 parts of a solvent (ethanol), 80.0 parts of 1-methacryloxyethane-1,1-diphosphonic acid, 20.0 parts of benzylacrylate and 4.0 parts of a polymerization initiator (azobisisobutylonitrile), and the mixture was heated to have a temperature of 65° C. Next, after the mixture was polymerized for 3 hrs under a nitrogen stream, about a half of the solvent in the reactant was removed. The resultant reactant was injected in acetone to extract a polymer, and the polymer is further dried to prepare a polymer 26. Potassium hydroxide was added to the polymer 26 while diluted with water to obtain an aqueous solution thereof, in which the phosphonic acid groups were neutralized by 100%. The polymer 26 had a weight-average molecular weight of 4,200.

Synthesis Example 27

Synthesis of Polymer 27

A flask equipped with a stirrer, a thermometer and a nitrogen gas introduction pipe was charged with 500.0 parts of a solvent (ethanol), 80.0 parts of 1-methacryloxyethane-1,1-diphosphonic acid, 20.0 parts of benzylacrylate and 4.0 parts of a polymerization initiator (azobisisobutylonitrile), and the mixture was heated to have a temperature of 50° C. Next, after the mixture was polymerized for 24 hrs under a nitrogen stream, about a half of the solvent in the reactant was removed. The resultant reactant was injected in acetone to extract a polymer, and the polymer is further dried to prepare a polymer 27. Potassium hydroxide was added to the polymer 27 while diluted with water to obtain an aqueous solution thereof, in which the phosphonic acid groups were neutralized by 100%. The polymer 27 had a weight-average molecular weight of 49,000.

Synthesis Example 28

Synthesis of Polymer 28

A flask equipped with a stirrer, a thermometer and a nitrogen gas introduction pipe was charged with 500.0 parts of a solvent (ethanol), 80.0 parts of 1-methacryloxyethane-1,1-diphosphonic acid, 20.0 parts of benzylacrylate and 4.0 parts of a polymerization initiator (azobisisobutylonitrile), and the mixture was heated to have a temperature of 50° C. Next, after the mixture was polymerized for 48 hrs under a nitrogen stream, about a half of the solvent in the reactant was removed. The resultant reactant was injected in acetone to extract a polymer, and the polymer is further dried to prepare a polymer 28. Potassium hydroxide was added to the polymer 28 while diluted with water to obtain an aqueous solution thereof, in which the phosphonic acid groups were neutralized by 100%. The polymer 28 had a weight-average molecular weight of 70,000.

Synthesis Example 29

Synthesis of Polymer 29

A flask equipped with a stirrer, a thermometer and a nitrogen gas introduction pipe was charged with 500.0 parts of a solvent (ethanol), 30.0 parts of 1-methacryloxyethane-1,1-diphosphonic acid, 70.0 parts of benzylacrylate and 4.0 parts of a polymerization initiator (azobisisobutylonitrile), and the mixture was heated to have a temperature of 65° C. Next, after the mixture was polymerized for 15 hrs under a nitrogen stream, about a half of the solvent in the reactant was removed. The resultant reactant was injected in acetone to extract a polymer, and the polymer is further dried to prepare a polymer 29. Lithium hydroxide was added to the polymer 29 while diluted with water to obtain an aqueous solution thereof, in which the phosphonic acid groups were neutralized by 100%. The polymer 29 had a weight-average molecular weight of 30,000.

Synthesis Example 30

Synthesis of Polymer 30

A flask equipped with a stirrer, a thermometer and a nitrogen gas introduction pipe was charged with 500.0 parts of a solvent (ethanol), 30.0 parts of 1-methacryloxyethane-1,1-diphosphonic acid, 70.0 parts of benzylacrylate and 4.0 parts of a polymerization initiator (azobisisobutylonitrile), and the mixture was heated to have a temperature of 65° C. Next, after the mixture was polymerized for 15 hrs under a nitrogen stream, about a half of the solvent in the reactant was removed. The resultant reactant was injected in acetone to extract a polymer, and the polymer is further dried to prepare a polymer 30. 2-amino-2-ethyl-1,3-propanediol (AEPD) was added to the polymer 30 while diluted with water to obtain an aqueous solution thereof, in which the phosphonic acid groups were neutralized by 100%. The polymer 30 had a weight-average molecular weight of 32,000.

TABLE 1

| Synthesis Example No. | Polymer No. | Polymer Constituents | | | | Polymer Weight-Average M/W | M in (1) |
|---|---|---|---|---|---|---|---|
| | | Monomer (7) | | Monomer (8) | | | |
| | | | Parts by Weight | | Parts by Weight | | |
| 1 | 1 | 1-M | 30 | BA | 70 | 31000 | K |
| 2 | 2 | 1-A | 30 | BA | 70 | 28000 | K |
| 3 | 3 | 1-M | 30 | BM | 70 | 31000 | K |
| 4 | 4 | 1-M | 30 | SA | 70 | 32000 | K |
| 5 | 5 | 1-A | 30 | SA | 70 | 33000 | K |
| 6 | 6 | 1-M | 30 | SM | 70 | 32000 | K |
| 7 | 7 | 1-M | 30 | BA | 70 | 30000 | K, H |

TABLE 1-continued

| Synthesis Example No. | Polymer No. | Polymer Constituents | | | | Polymer Weight-Average M/W | M in (1) |
|---|---|---|---|---|---|---|---|
| | | Monomer (7) | | Monomer (8) | | | |
| | | | Parts by Weight | | Parts by Weight | | |
| 8 | 8 | 1-M | 30 | BA | 70 | 31000 | EA |
| 9 | 9 | 1-M | 30 | BA | 70 | 2100 | K |
| 10 | 10 | 1-M | 30 | BA | 70 | 4200 | K |
| 11 | 11 | 1-M | 30 | BA | 70 | 50000 | K |
| 12 | 12 | 1-M | 30 | BA | 70 | 70000 | K |
| 13 | 13 | 1-M | 5 | BA | 95 | 2000 | K |
| 14 | 14 | 1-M | 5 | BA | 95 | 4000 | K |
| 15 | 15 | 1-M | 5 | BA | 95 | 49000 | K |
| 16 | 16 | 1-M | 5 | BA | 95 | 69000 | K |
| 17 | 17 | 1-M | 10 | BA | 90 | 2200 | K |
| 18 | 18 | 1-M | 10 | BA | 90 | 4300 | K |
| 19 | 19 | 1-M | 10 | BA | 90 | 50000 | K |
| 20 | 20 | 1-M | 10 | BA | 90 | 68000 | K |
| 21 | 21 | 1-M | 60 | BA | 40 | 2100 | K |
| 22 | 22 | 1-M | 60 | BA | 40 | 4000 | K |
| 23 | 23 | 1-M | 60 | BA | 40 | 48000 | K |
| 24 | 24 | 1-M | 60 | BA | 40 | 70000 | K |
| 25 | 25 | 1-M | 80 | BA | 20 | 2200 | K |
| 26 | 26 | 1-M | 80 | BA | 20 | 4200 | K |
| 27 | 27 | 1-M | 80 | BA | 20 | 49000 | K |
| 28 | 28 | 1-M | 80 | BA | 20 | 70000 | K |
| 29 | 29 | 1-M | 30 | BA | 70 | 30000 | Li |
| 30 | 30 | 1-M | 30 | BA | 70 | 30000 | AEPD |

*1-M: 1-methacrloxyethane-1,1-diphosphonic acid
1-A: 1-acrloxyethane-1,1-diphosphonic acid
BA: benzyl acrylate
BM: benzyl methacrylate
SA: stearyl acrylate
SM; stearyl methacrylate
EA: ethanol amine Synthesis Example 31

Synthesis of Polymer 31

A flask equipped with a stirrer, a thermometer and a nitrogen gas introduction pipe was charged with 500.0 parts of a solvent (ethanol), 30.0 parts of 1-methacryloxyethane-1,1-diphosphonic acid represented by the formula (11), 70.0 parts of oleyl methacrylate represented by the formula (15) and 4.0 parts of a polymerization initiator (azobisisobutylonitrile), and the mixture was heated to have a temperature of 65° C. Next, after the mixture was polymerized for 15 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 31 was synthesized, in which the phosphonic acid groups were neutralized by 100%. The polymer 31 had a weight-average molecular weight of 30,000.

Synthesis Example 32

Synthesis of Polymer 32

A flask equipped with a stirrer, a thermometer and a nitrogen gas introduction pipe was charged with 500.0 parts of a solvent (ethanol), 30.0 parts of 1-acryloxyethane-1,1-diphosphonic acid represented by the formula (12), 70.0 parts of oleyl methacrylate represented by the formula (15) and 4.0 parts of a polymerization initiator (azobisisobutylonitrile), and the mixture was heated to have a temperature of 65° C. Next, after the mixture was polymerized for 15 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 32 was synthesized, in which the phosphonic acid groups were neutralized by 100%. The polymer 32 had a weight-average molecular weight of 27,000.

Synthesis Example 33

Synthesis of Polymer 33

A flask equipped with a stirrer, a thermometer and a nitrogen gas introduction pipe was charged with 500.0 parts of a solvent (ethanol), 30.0 parts of 1-methacryloxyethane-1,1-diphosphonic acid represented by the formula (11), 70.0 parts of oleyl acrylate represented by the formula (16) and 4.0 parts of a polymerization initiator (azobisisobutylonitrile), and the mixture was heated to have a temperature of 65° C. Next, after the mixture was polymerized for 15 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 33 was synthesized, in which the phosphonic acid groups were neutralized by 100%. The polymer 33 had a weight-average molecular weight of 32,000.

Synthesis Example 34

Synthesis of Polymer 34

A flask equipped with a stirrer, a thermometer and a nitrogen gas introduction pipe was charged with 500.0 parts of a solvent (ethanol), 30.0 parts of 1-acryloxyethane-1,1-diphosphonic acid represented by the formula (12), 70.0 parts of oleyl acrylate represented by the formula (16) and 4.0 parts of a polymerization initiator (azobisisobutylonitrile), and the mixture was heated to have a temperature of 65° C. Next, after the mixture was polymerized for 15 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 34 was synthesized, in which the phosphonic acid groups were neutralized by 100%. The polymer 34 had a weight-average molecular weight of 33,000.

Synthesis Example 35

Synthesis of Polymer 35

A flask equipped with a stirrer, a thermometer and a nitrogen gas introduction pipe was charged with 500.0 parts of a solvent (ethanol), 30.0 parts of 1-methacryloxyethane-1,1-diphosphonic acid represented by the formula (11), 70.0 parts of oleyl methacrylate represented by the formula (15) and 4.0 parts of a polymerization initiator (azobisisobutylonitrile), and the mixture was heated to have a temperature of 65° C. Next, after the mixture was polymerized for 15 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 35 was synthesized, in which the phosphonic acid groups were neutralized by 50%. The polymer 35 had a weight-average molecular weight of 30,000.

Synthesis Example 36

Synthesis of Polymer 36

A flask equipped with a stirrer, a thermometer and a nitrogen gas introduction pipe was charged with 500.0 parts of a solvent (ethanol), 30.0 parts of 1-methacryloxyethane-1,1-diphosphonic acid represented by the formula (11), 70.0 parts of oleyl methacrylate represented by the formula (15) and 4.0 parts of a polymerization initiator (azobisisobutylonitrile), and the mixture was heated to have a temperature of 65° C. Next, after the mixture was polymerized for 15 hrs under a nitrogen stream, about a half of the solvent in the reactant was removed. The resultant reactant was injected in acetone to extract a polymer, and the polymer is further dried to prepare a polymer. Ethanol amine was added to the polymer while diluted with water so as to include a solid content of 10% by weight. Thus, a polymer 36 was synthesized, in which the phosphonic acid groups were neutralized by 100%. The polymer 36 had a weight-average molecular weight of 31,000.

Synthesis Example 37

Synthesis of Polymer 37

A flask equipped with a stirrer, a thermometer and a nitrogen gas introduction pipe was charged with 500.0 parts of a solvent (ethanol), 30.0 parts of 1-methacryloxyethane-1,1-diphosphonic acid represented by the formula (11), 70.0 parts of oleyl methacrylate represented by the formula (15) and 4.0 parts of a polymerization initiator (azobisisobutylonitrile), and the mixture was heated to have a temperature of 75° C. Next, after the mixture was polymerized for 3 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 37 was synthesized, in which the phosphonic acid groups were neutralized by 100%. The polymer 37 had a weight-average molecular weight of 3,100.

Synthesis Example 38

Synthesis of Polymer 38

A flask equipped with a stirrer, a thermometer and a nitrogen gas introduction pipe was charged with 500.0 parts of a solvent (ethanol), 30.0 parts of 1-methacryloxyethane-1,1-diphosphonic acid represented by the formula (11), 70.0 parts of oleyl methacrylate represented by the formula (15) and 4.0 parts of a polymerization initiator (azobisisobutylonitrile), and the mixture was heated to have a temperature of 70° C. Next, after the mixture was polymerized for 3 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 38 was synthesized, in which the phosphonic acid groups were neutralized by 100%. The polymer 38 had a weight-average molecular weight of 4,100.

Synthesis Example 39

Synthesis of Polymer 39

A flask equipped with a stirrer, a thermometer and a nitrogen gas introduction pipe was charged with 500.0 parts of a solvent (ethanol), 30.0 parts of 1-methacryloxyethane-1,1-diphosphonic acid represented by the formula (11), 70.0 parts of oleyl methacrylate represented by the formula (15) and 4.0 parts of a polymerization initiator (azobisisobutylonitrile), and the mixture was heated to have a temperature of 50° C. Next, after the mixture was polymerized for 24 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 39 was synthesized, in which the phosphonic acid groups were neutralized by 100%. The polymer 39 had a weight-average molecular weight of 50,000.

Synthesis Example 40

Synthesis of Polymer 40

A flask equipped with a stirrer, a thermometer and a nitrogen gas introduction pipe was charged with 500.0 parts of a solvent (ethanol), 30.0 parts of 1-methacryloxyethane-1,1-diphosphonic acid represented by the formula (11), 70.0 parts of oleyl methacrylate represented by the formula (15) and 4.0 parts of a polymerization initiator (azobisisobutylonitrile), and the mixture was heated to have a temperature of 50° C. Next, after the mixture was polymerized for 48 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 40 was synthesized, in which the phosphonic acid groups were neutralized by 100%. The polymer 40 had a weight-average molecular weight of 69,000.

Synthesis Example 41

Synthesis of Polymer 41

A flask equipped with a stirrer, a thermometer and a nitrogen gas introduction pipe was charged with 500.0 parts of a solvent (ethanol), 5.0 parts of 1-methacryloxyethane-1,1-diphosphonic acid represented by the formula (11), 95.0 parts of oleyl methacrylate represented by the formula (15) and 4.0 parts of a polymerization initiator (azobisisobutylonitrile), and the mixture was heated to have a temperature of 75° C. Next, after the mixture was polymerized for 3 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 41 was synthesized, in which the phosphonic acid groups were neutralized by 100%. The polymer 41 had a weight-average molecular weight of 3,200.

Synthesis Example 42

Synthesis of Polymer 42

A flask equipped with a stirrer, a thermometer and a nitrogen gas introduction pipe was charged with 500.0 parts of a solvent (ethanol), 5.0 parts of 1-methacryloxyethane-1,1-diphosphonic acid represented by the formula (11), 95.0 parts of oleyl methacrylate represented by the formula (15) and 4.0 parts of a polymerization initiator (azobisisobutylonitrile), and the mixture was heated to have a temperature of 70° C. Next, after the mixture was polymerized for 5 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 42 was synthesized, in which the phosphonic acid groups were neutralized by 100%. The polymer 42 had a weight-average molecular weight of 4,000.

Synthesis Example 43

Synthesis of Polymer 43

A flask equipped with a stirrer, a thermometer and a nitrogen gas introduction pipe was charged with 500.0 parts of a solvent (ethanol), 5.0 parts of 1-methacryloxyethane-1,1-diphosphonic acid represented by the formula (11), 95.0 parts of oleyl methacrylate represented by the formula (15) and 4.0 parts of a polymerization initiator (azobisisobutylonitrile), and the mixture was heated to have a temperature of 50° C. Next, after the mixture was polymerized for 24 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 43 was synthesized, in which the phosphonic acid groups were neutralized by 100%. The polymer 43 had a weight-average molecular weight of 49,000.

Synthesis Example 44

Synthesis of Polymer 44

A flask equipped with a stirrer, a thermometer and a nitrogen gas introduction pipe was charged with 500.0 parts of a solvent (ethanol), 5.0 parts of 1-methacryloxyethane-1,1-diphosphonic acid represented by the formula (11), 95.0 parts of oleyl methacrylate represented by the formula (15) and 4.0 parts of a polymerization initiator (azobisisobutylonitrile), and the mixture was heated to have a temperature of 50° C. Next, after the mixture was polymerized for 48 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 44 was synthesized, in which the phosphonic acid groups were neutralized by 100%. The polymer 44 had a weight-average molecular weight of 70,000.

Synthesis Example 45

Synthesis of Polymer 45

A flask equipped with a stirrer, a thermometer and a nitrogen gas introduction pipe was charged with 500.0 parts of a solvent (ethanol), 10.0 parts of 1-methacryloxyethane-1,1-diphosphonic acid represented by the formula (11), 90.0 parts of oleyl methacrylate represented by the formula (15) and 4.0 parts of a polymerization initiator (azobisisobutylonitrile), and the mixture was heated to have a temperature of 75° C. Next, after the mixture was polymerized for 3 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 45 was synthesized, in which the phosphonic acid groups were neutralized by 100%. The polymer 45 had a weight-average molecular weight of 3,200.

Synthesis Example 46

Synthesis of Polymer 46

A flask equipped with a stirrer, a thermometer and a nitrogen gas introduction pipe was charged with 500.0 parts of a solvent (ethanol), 10.0 parts of 1-methacryloxyethane-1,1-diphosphonic acid represented by the formula (11), 90.0 parts of oleyl methacrylate represented by the formula (15) and 4.0 parts of a polymerization initiator (azobisisobutylonitrile), and the mixture was heated to have a temperature of 70° C. Next, after the mixture was polymerized for 3 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 46 was synthesized, in which the phosphonic acid groups were neutralized by 100%. The polymer 46 had a weight-average molecular weight of 4,200.

Synthesis Example 47

Synthesis of Polymer 47

A flask equipped with a stirrer, a thermometer and a nitrogen gas introduction pipe was charged with 500.0 parts of a solvent (ethanol), 10.0 parts of 1-methacryloxyethane-1,1-diphosphonic acid represented by the formula (11), 90.0 parts of oleyl methacrylate represented by the formula (15) and 4.0 parts of a polymerization initiator (azobisisobutylonitrile), and the mixture was heated to have a temperature of 50° C. Next, after the mixture was polymerized for 24 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 47 was synthesized, in which the phosphonic acid groups were neutralized by 100%. The polymer 47 had a weight-average molecular weight of 50,000.

Synthesis Example 48

Synthesis of Polymer 48

A flask equipped with a stirrer, a thermometer and a nitrogen gas introduction pipe was charged with 500.0 parts of a solvent (ethanol), 10.0 parts of 1-methacryloxyethane-1,1-diphosphonic acid represented by the formula (11), 90.0 parts of oleyl methacrylate represented by the formula (15) and 4.0 parts of a polymerization initiator (azobisisobutylonitrile), and the mixture was heated to have a temperature of 50° C. Next, after the mixture was polymerized for 48 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 48 was synthesized, in which the phosphonic acid groups were neutralized by 100%. The polymer 48 had a weight-average molecular weight of 69,000.

Synthesis Example 49

Synthesis of Polymer 49

A flask equipped with a stirrer, a thermometer and a nitrogen gas introduction pipe was charged with 500.0 parts of a solvent (ethanol), 60.0 parts of 1-methacryloxyethane-1,1-diphosphonic acid represented by the formula (11), 40.0 parts of oleyl methacrylate represented by the formula (15) and 4.0 parts of a polymerization initiator (azobisisobutylonitrile), and the mixture was heated to have a temperature of 75° C. Next, after the mixture was polymerized for 3 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 49 was synthesized, in which the phosphonic acid groups were neutralized by 100%. The polymer 49 had a weight-average molecular weight of 3,200.

Synthesis Example 50

Synthesis of Polymer 50

A flask equipped with a stirrer, a thermometer and a nitrogen gas introduction pipe was charged with 500.0 parts of a solvent (ethanol), 60.0 parts of 1-methacryloxyethane-1,1-diphosphonic acid represented by the formula (11), 40.0 parts of oleyl methacrylate represented by the formula (15) and 4.0 parts of a polymerization initiator (azobisisobutylonitrile), and the mixture was heated to have a temperature of 70° C. Next, after the mixture was polymerized for 3 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 50 was synthesized, in which the phosphonic acid groups were neutralized by 100%. The polymer 50 had a weight-average molecular weight of 4,100.

Synthesis Example 51

Synthesis of Polymer 51

A flask equipped with a stirrer, a thermometer and a nitrogen gas introduction pipe was charged with 500.0 parts of a solvent (ethanol), 60.0 parts of 1-methacryloxyethane-1,1-diphosphonic acid represented by the formula (11), 40.0 parts of oleyl methacrylate represented by the formula (15) and 4.0 parts of a polymerization initiator (azobisisobutylonitrile), and the mixture was heated to have a temperature of 50° C. Next, after the mixture was polymerized for 24 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 51 was synthesized, in which the phosphonic acid groups were neutralized by 100%. The polymer 51 had a weight-average molecular weight of 48,000.

Synthesis Example 52

Synthesis of Polymer 52

A flask equipped with a stirrer, a thermometer and a nitrogen gas introduction pipe was charged with 500.0 parts of a solvent (ethanol), 60.0 parts of 1-methacryloxyethane-1,1-diphosphonic acid represented by the formula (11), 40.0 parts of oleyl methacrylate represented by the formula (15) and 4.0 parts of a polymerization initiator (azobisisobutylonitrile), and the mixture was heated to have a temperature of 50° C. Next, after the mixture was polymerized for 48 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 52 was synthesized, in which the phosphonic acid groups were neutralized by 100%. The polymer 52 had a weight-average molecular weight of 70,000.

Synthesis Example 53

Synthesis of Polymer 53

A flask equipped with a stirrer, a thermometer and a nitrogen gas introduction pipe was charged with 500.0 parts of a solvent (ethanol), 80.0 parts of 1-methacryloxyethane-1,1-diphosphonic acid represented by the formula (11), 20.0 parts of oleyl methacrylate represented by the formula (15) and 4.0 parts of a polymerization initiator (azobisisobutylonitrile), and the mixture was heated to have a temperature of 75° C. Next, after the mixture was polymerized for 3 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 53 was synthesized, in which the phosphonic acid groups were neutralized by 100%. The polymer 53 had a weight-average molecular weight of 3,100.

Synthesis Example 54

Synthesis of Polymer 54

A flask equipped with a stirrer, a thermometer and a nitrogen gas introduction pipe was charged with 500.0 parts of a solvent (ethanol), 80.0 parts of 1-methacryloxyethane-1,1-diphosphonic acid represented by the formula (11), 20.0 parts of oleyl methacrylate represented by the formula (15) and 4.0 parts of a polymerization initiator (azobisisobutylonitrile), and the mixture was heated to have a temperature of 70° C. Next, after the mixture was polymerized for 3 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 54 was synthesized, in which the phosphonic acid groups were neutralized by 100%. The polymer 54 had a weight-average molecular weight of 4,100.

Synthesis Example 55

Synthesis of Polymer 55

A flask equipped with a stirrer, a thermometer and a nitrogen gas introduction pipe was charged with 500.0 parts of a solvent (ethanol), 80.0 parts of 1-methacryloxyethane-1,1-diphosphonic acid represented by the formula (11), 20.0 parts of oleyl methacrylate represented by the formula (15) and 4.0 parts of a polymerization initiator (azobisisobutylonitrile), and the mixture was heated to have a temperature of 50° C. Next, after the mixture was polymerized for 24 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 55 was synthesized, in which the phosphonic acid groups were neutralized by 100%. The polymer 55 had a weight-average molecular weight of 49,000.

Synthesis Example 56

Synthesis of Polymer 56

A flask equipped with a stirrer, a thermometer and a nitrogen gas introduction pipe was charged with 500.0 parts of a solvent (ethanol), 80.0 parts of 1-methacryloxyethane-1,1-diphosphonic acid represented by the formula (11), 20.0 parts of oleyl methacrylate represented by the formula (15) and 4.0 parts of a polymerization initiator (azobisisobutylonitrile), and the mixture was heated to have a temperature of 50° C. Next, after the mixture was polymerized for 48 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 56 was synthesized, in which the phosphonic acid groups were neutralized by 100%. The polymer 56 had a weight-average molecular weight of 71,000.

Comparative Synthesis Example 1

Synthesis of Polymer 57

A flask equipped with a stirrer, a thermometer and a nitrogen gas introduction pipe was charged with 500.0 parts of a solvent (ethanol), 100.0 parts of 4-methacrylamide-1-hydroxybutane-1,1-diphosphonic acid having the following formula (19) and 4.0 parts of a polymerization initiator (azobisisobutylonitrile), and the mixture was heated to have a temperature of 70° C.

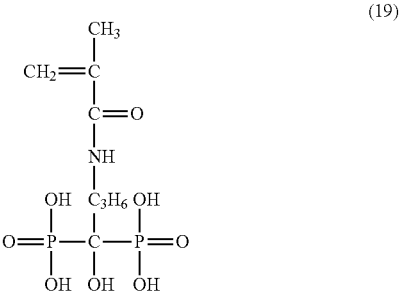

Next, after the mixture was polymerized for 5 hrs under a nitrogen stream, about a half of the solvent in the reactant was removed. The resultant reactant was injected in acetone to extract a polymer, and the polymer is further dried to prepare a polymer. Potassium hydroxide was added to the polymer while diluted with water so as to include a solid content of 10% by weight. Thus, a polymer 57 was synthesized, in which the phosphonic acid groups were neutralized by 100%. The polymer 57 had a weight-average molecular weight of 4,100.

Comparative Synthesis Example 2

Preparation of Aqueous Solution of Hydroxy Ethylidene Diphosphonic Acid Potassium Potassium hydroxide was added to hydroxy ethylidene diphosphonic acid (HEDP) represented by the following formula (20) to be neutralized by 100% while diluted with water so as to include a solid content of 10% by weight.

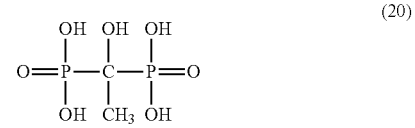

Thus, an aqueous solution of hydroxy ethylidene diphosphonic acid potassium (including a solid content of 10% by weight) was prepared.

Properties of these polymers and the aqueous solution of hydroxy ethylidene diphosphonic acid potassium are shown in Table 2.

| Synthesis Example No. | Polymer No. | Monomer (7) | Parts by Weight | Monomer (8) | Parts by Weight | Polymer Weight-Average M/W | M in (1) |
|---|---|---|---|---|---|---|---|
| 31 | 31 | 1-M | 30 | OM | 70 | 30000 | K |
| 32 | 32 | 1-A | 30 | OM | 70 | 27000 | K |
| 33 | 33 | 1-M | 30 | OA | 70 | 32000 | K |
| 34 | 34 | 1-A | 30 | OA | 70 | 33000 | K |
| 35 | 35 | 1-M | 30 | OM | 70 | 30000 | K, H |
| 36 | 36 | 1-M | 30 | OM | 70 | 31000 | EA |
| 37 | 37 | 1-M | 30 | OM | 70 | 3100 | K |
| 38 | 38 | 1-M | 30 | OM | 70 | 4100 | K |
| 39 | 39 | 1-M | 30 | OM | 70 | 50000 | K |

-continued

| Synthesis Example No. | Polymer No. | Polymer Constituents | | | | Polymer Weight-Average M/W | M in (1) |
|---|---|---|---|---|---|---|---|
| | | Monomer (7) | Parts by Weight | Monomer (8) | Parts by Weight | | |
| 40 | 40 | 1-M | 30 | OM | 70 | 69000 | K |
| 41 | 41 | 1-M | 5 | OM | 95 | 3200 | K |
| 42 | 42 | 1-M | 5 | OM | 95 | 4000 | K |
| 43 | 43 | 1-M | 5 | OM | 95 | 49000 | K |
| 44 | 44 | 1-M | 5 | OM | 95 | 70000 | K |
| 45 | 45 | 1-M | 10 | OM | 90 | 3100 | K |
| 46 | 46 | 1-M | 10 | OM | 90 | 4200 | K |
| 47 | 47 | 1-M | 10 | OM | 90 | 50000 | K |
| 48 | 48 | 1-M | 10 | OM | 90 | 69000 | K |
| 49 | 49 | 1-M | 60 | OM | 40 | 3200 | K |
| 50 | 50 | 1-M | 60 | OM | 40 | 4100 | K |
| 51 | 51 | 1-M | 60 | OM | 40 | 48000 | K |
| 52 | 52 | 1-M | 60 | OM | 40 | 70000 | K |
| 53 | 53 | 1-M | 80 | OM | 20 | 3100 | K |
| 54 | 54 | 1-M | 80 | OM | 20 | 4100 | K |
| 55 | 55 | 1-M | 80 | OM | 20 | 49000 | K |
| 56 | 56 | 1-M | 80 | OM | 20 | 71000 | K |
| Comparative Synthesis Example 1 | 57 | 4-M | 100 | — | 0 | 4100 | K |
| Comparative Synthesis Example 2 | — | HEDP | 100 | — | 0 | 206 | K |

*1-M: 1-methacrloxyethane-1,1-diphosphonic acid
1-A: 1-acrloxyethane-1,1-diphosphonic acid
OM: oleyl methacrylate
OA: oleyl acrylate
4-M: 4-methacryl amide-1-hydroxybutane-1,1-diphosphonic acid
EA: ethanol amine Example 1

Preparation of Pigment Dispersion 1

The following materials were premixed, subjected to a circulation dispersion by a disc type beads mill (KDL type from Shinmaru Enterprises Corp., using zirconia beads having a diameter of 0.1 mm) at a peripheral speed of 10 m/s for 10 min, and filtered with a membrane filter having an aperture of 1.2 μm to prepare a pigment dispersion 1.
  Carbon black (NIPEX150 from Degussa AG) 20.0
  Naphthalene sulfonic acid Na formalin condensate 13.0
  (including a solid content of 10% by weight)
  (Pionine A-45PN manufactured by Takemoto Oil & Fat Co., Ltd.)
  Pure water 67.0
—Preparation of Ink—
The following materials were mixed, stirred for 1.5 hrs and filtered with a membrane filter having an aperture of 1.2 μm to prepare an ink of Example 1.
  Pigment Dispersion 1 40.0
  (including a solid content of pigment in an amount of 20% by weight)
  1,3-butanediol (hydrosoluble solvent) 20.0
  Glycerin (hydrosoluble solvent) 10.0
  2-ethyl-1,3-hexanediol (hydrosoluble solvent) 1.0
  2,2,4-trimethyl-1,3-pentadiol (hydrosoluble solvent) 1.0
  Fluorine surfactant 2.0
  (Zonyl FS-300 from DuPont including a solid content in an amount of 40% by weight)
  Aqueous Solution of Polymer 1 20.0
  (including a solid content in an amount of 10% by weight)
  Distilled water 6.0

Example 2

The procedure for preparation of the ink in Example 1 was repeated except for replacing the aqueous solution of polymer 1 with the aqueous solution of polymer 2 (including a solid content in an amount of 10% by weight) to prepare an ink of Example 2.

Example 3

The procedure for preparation of the ink in Example 1 was repeated except for replacing the aqueous solution of polymer 1 with the aqueous solution of polymer 3 (including a solid content in an amount of 10% by weight) to prepare an ink of Example 3.

Example 4

The procedure for preparation of the ink in Example 1 was repeated except for replacing the aqueous solution of polymer 1 with the aqueous solution of polymer 4 (including a solid content in an amount of 10% by weight) to prepare an ink of Example 4.

Example 5

The procedure for preparation of the ink in Example 1 was repeated except for replacing the aqueous solution of polymer 1 with the aqueous solution of polymer 5 (including a solid content in an amount of 10% by weight) to prepare an ink of Example 5.

Example 6

The procedure for preparation of the ink in Example 1 was repeated except for replacing the aqueous solution of polymer 1 with the aqueous solution of polymer 6 (including a solid content in an amount of 10% by weight) to prepare an ink of Example 6.

Example 7

Preparation of Pigment Dispersion 7

The following materials were premixed, subjected to a circulation dispersion by a disc type beads mill (KDL type from Shinmaru Enterprises Corp., using zirconia beads having a diameter of 0.1 mm) at a peripheral speed of 10 m/s for 10 min, and filtered with a membrane filter having an aperture of 1.2 μm to prepare a pigment dispersion 7.
  Carbon black (NIPEX150 from Degussa AG) 20.0
  Aqueous Solution of Polymer 1 50.0
  (including a solid content of 10% by weight)
  Pure water 30.0
—Preparation of Ink—
The following materials were mixed, stirred for 1.5 hrs and filtered with a membrane filter having an aperture of 1.2 μm to prepare an ink of Example 7.
  Pigment Dispersion 7 40.0
  (including a solid content of pigment in an amount of 20% by weight)
  1,3-butanediol (hydrosoluble solvent) 20.0
  Glycerin (hydrosoluble solvent) 10.0
  2-ethyl-1,3-hexanediol (hydrosoluble solvent) 1.0
  2,2,4-trimethyl-1,3-pentadiol (hydrosoluble solvent) 1.0
  Fluorine surfactant 2.0
  (Zonyl FS-300 from DuPont including a solid content in an amount of 40% by weight)
  Distilled water 26.0

Example 8

The procedure for preparation of the pigment dispersion 7 in Example 7 was repeated except for replacing the carbon black with Pigment Blue 15:3 (Cyan Pigment CHROMOFINE BLUE from Dainichiseika Color & Chemicals Mfg. Co., Ltd.) to prepare a pigment dispersion 8.

Next, the procedure for preparation of the ink in Example 7 was repeated except for replacing the pigment dispersion 7 with the pigment dispersion 8 to prepare an ink of Example 8.

Example 9

The procedure for preparation of the pigment dispersion 7 in Example 7 was repeated except for replacing the carbon black with Pigment Red 122 (Magenta Pigment Toner Magenta EO02 from Clariant) to prepare a pigment dispersion 9.

Next, the procedure for preparation of the ink in Example 7 was repeated except for replacing the pigment dispersion 7 with the pigment dispersion 9 to prepare an ink of Example 9.

Example 10

The procedure for preparation of the pigment dispersion 7 in Example 7 was repeated except for replacing the carbon black with Pigment Yellow (Yellow Pigment Fast Yellow 531 from Dainichiseika Color & Chemicals Mfg. Co., Ltd.) to prepare a pigment dispersion 10.

Next, the procedure for preparation of the ink in Example 7 was repeated except for replacing the pigment dispersion 7 with the pigment dispersion 10 to prepare an ink of Example 10.

Examples 11 to 39

The procedure for preparation of the pigment dispersion 7 in Example 7 was repeated except for replacing the aqueous solution of polymer 7 with aqueous solutions of polymer 2 to 30 (each including a solid content of 10% by weight) as shown in Table 3 to prepare pigment dispersions 11 to 39.

Next, the procedure for preparation of the ink in Example 7 was repeated except for replacing the pigment dispersion 7 with the pigment dispersions 11 to 39 to prepare inks of Examples 11 to 39.

Example 40

Preparation of Pigment Dispersion 40

The following materials were premixed, subjected to a circulation dispersion by a disc type beads mill (KDL type from Shinmaru Enterprises Corp., using zirconia beads having a diameter of 0.1 mm) at a peripheral speed of 10 m/s for 10 min, and filtered with a membrane filter having an aperture of 1.2 μm to prepare a pigment dispersion 40.
  Carbon black (NIPEX150 from Degussa AG) 20.0
  Naphthalene sulfonic acid Na formalin condensate 13.0
  (including a solid content of 10% by weight)
  Pure water 67.0
—Preparation of Ink—
The following materials were mixed, stirred for 1.5 hrs and filtered with a membrane filter having an aperture of 1.2 μm to prepare an ink of Example 40.
  Pigment Dispersion 40 40.0
  (including a solid content of pigment in an amount of 20% by weight)
  1,3-butanediol (hydrosoluble solvent) 20.0
  Glycerin (hydrosoluble solvent) 10.0
  2-ethyl-1,3-hexanediol (hydrosoluble solvent) 1.0
  2,2,4-trimethyl-1,3-pentadiol (hydrosoluble solvent) 1.0
  Fluorine surfactant 2.0
  (Zonyl FS-300 from DuPont including a solid content in an amount of 40% by weight)
  Aqueous Solution of Polymer 31 20.0
  (including a solid content in an amount of 10% by weight)
  Distilled water 6.0

Example 41

The procedure for preparation of the ink in Example 40 was repeated except for replacing the aqueous solution of polymer 31 with the aqueous solution of polymer 32 to prepare an ink of Example 41.

Example 42

The procedure for preparation of the ink in Example 40 was repeated except for replacing the aqueous solution of polymer 31 with the aqueous solution of polymer 33 to prepare an ink of Example 42.

Example 43

The procedure for preparation of the ink in Example 40 was repeated except for replacing the aqueous solution of polymer 31 with the aqueous solution of polymer 34 to prepare an ink of Example 43.

Example 44

Preparation of Pigment Dispersion 41

The following materials were premixed, subjected to a circulation dispersion by a disc type beads mill (KDL type from Shinmaru Enterprises Corp., using zirconia beads having a diameter of 0.1 mm) at a peripheral speed of 10 m/s for 10 min, and filtered with a membrane filter having an aperture of 1.2 μm to prepare a pigment dispersion 41.
  Carbon black (NIPEX150 from Degussa AG) 20.0
  Aqueous Solution of Polymer 31 50.0
  (including a solid content of 10% by weight)
  Pure water 30.0
—Preparation of Ink—
The following materials were mixed, stirred for 1.5 hrs and filtered with a membrane filter having an aperture of 1.2 μm to prepare an ink of Example 7.
  Pigment Dispersion 41 40.0
  (including a solid content of pigment in an amount of 20% by weight)
  1,3-butanediol (hydrosoluble solvent) 20.0
  Glycerin (hydrosoluble solvent) 10.0
  2-ethyl-1,3-hexanediol (hydrosoluble solvent) 1.0
  2,2,4-trimethyl-1,3-pentadiol (hydrosoluble solvent) 1.0
  Fluorine surfactant 2.0
  (Zonyl FS-300 from DuPont including a solid content in an amount of 40% by weight)
  Distilled water 26.0

Example 45

The procedure for preparation of the pigment dispersion 41 in Example 44 was repeated except for replacing the carbon black with Pigment Blue 15:3 (Cyan Pigment CHRO- MOFINE BLUE from Dainichiseika Color & Chemicals Mfg. Co., Ltd.) to prepare a pigment dispersion 42.

Next, the procedure for preparation of the ink in Example 44 was repeated except for replacing the pigment dispersion 41 with the pigment dispersion 42 to prepare an ink of Example 45.

Example 46

The procedure for preparation of the pigment dispersion 41 in Example 44 was repeated except for replacing the carbon black with Pigment Red 122 (Magenta Pigment Toner Magenta EO02 from Clariant) to prepare a pigment dispersion 43.

Next, the procedure for preparation of the ink in Example 44 was repeated except for replacing the pigment dispersion 41 with the pigment dispersion 43 to prepare an ink of Example 46.

Examples 47 to 72

The procedure for preparation of the pigment dispersion 41 in Example 44 was repeated except for replacing the aqueous solution of polymer 41 with aqueous solutions of polymer 32 to 56 (each including a solid content of 10% by weight) as shown in Table 4 to prepare pigment dispersions 44 to 69.

Next, the procedure for preparation of the ink in Example 44 was repeated except for replacing the pigment dispersion 41 with the pigment dispersions 44 to 69 to prepare inks of Examples 47 to 72.

Comparative Example 1

The procedure for preparation of the ink in Example 40 was repeated except for replacing the aqueous solution of polymer 31 with the aqueous solution of polymer 57 to prepare an ink of Comparative Example 1.

Comparative Example 2

The procedure for preparation of the ink in Example 40 was repeated except for replacing the aqueous solution of polymer 31 with hydroxy ethylidenediphosphonic acid to prepare an ink of Comparative Example 2.

The inks prepared in Examples 1 to 72 and Comparative Examples 1 to 2 were evaluated as follows. The results are shown in Tables 3 and 4.

<Image Density>

In an environment of 23° C. and 50 RH, the ink was filled in an inkjet printer IPSiO GX5000 from Ricoh Company, Ltd. After a chart on which general marks of JIS X 0208 (1997), 2223 having 64 points are described by Microsoft Word 2003 was printed on a plain paper 1 (XEROX 4200 from XEROX, Inc.) and a plain paper 2 (My Paper from Ricoh Company, Ltd.), the image density of the general marks was measured using X-Rite938 from X-Rite, Inc. Then, the printing mode was "plain paper-fast" mode by a driver of the printer "without color calibration".

Image density was evaluated under the following standard.
A: not less than 1.25
B: not less than 1.20 and less than 1.25
C: not less than 1.10 and less than 1.20
D: less than 1.10
E: Unprintable as pigment was gelated and undispersible <Storage Stability of Pigment Dispersion>

Each of the pigment dispersions was placed in a polyethylene container and sealed. The viscosity after stored at 60° C. for 1 week was measured to evaluate under the following standard, compared with the initial viscosity. The viscosity was measured by a viscometer RE500L from TOKI SANGYO CO., LTD. at 25° C.

Viscosity Variation(%)=[(Y−X)/X]×100 wherein X represents a viscosity of the pigment dispersion before stored and Y represents a viscosity thereof after stored.
A: Viscosity variation was not greater than ±5%
B: Viscosity variation was greater than ±5% and not greater than ±8%
C: Viscosity variation was greater than ±8% and not greater than ±10%
D: Viscosity variation was greater than ±10% and not greater than ±30%
E: Viscosity variation was greater than ±30% (Unevaluable as pigment was gelated)<Storage Stability of Ink>

Each of the inks was filled in an ink cartridge. The viscosity after stored at 60° C. for 1 week was measured to evaluate under the following standard, compared with the initial viscosity. The viscosity was measured by a viscometer RE500L from TOKI SANGYO CO., LTD. at 25° C.

Viscosity Variation(%)=[(Q−P)/P]×100 wherein Q represents a viscosity of the ink before stored and Y represents a viscosity thereof after stored
A: Viscosity variation was not greater than ±5%
B: Viscosity variation was greater than ±5% and not greater than ±8%
C: Viscosity variation was greater than ±8% and not greater than ±10%
D: Viscosity variation was greater than ±10% and not greater than ±30%
E: Viscosity variation was greater than ±30% (Unevaluable as pigment was gelated)

TABLE 3

| | | | | Effect | | | |
|---|---|---|---|---|---|---|---|
| | | Pigment Dispersion | | Plain | Plain | Pigment | |
| Example | Polymer No. | Other Dispersible Material | Pigment | Paper 1 Image Density | Paper 2 Image Density | Dispersion Storage Stability | Ink Storage Stability |
| Example 1 | 1 | *1 | CB | A | B | B | B |
| Example 2 | 2 | *1 | CB | B | B | B | B |
| Example 3 | 3 | *1 | CB | A | B | B | C |
| Example 4 | 4 | *1 | CB | B | B | C | C |
| Example 5 | 5 | *1 | CB | A | B | C | C |
| Example 6 | 6 | *1 | CB | A | B | C | C |
| Example 7 | 1 | — | CB | A | A | A | A |
| Example 8 | 1 | — | CP | A | A | A | A |

TABLE 3-continued

|  |  | Pigment Dispersion | | Effect | | | |
|---|---|---|---|---|---|---|---|
|  |  |  |  | Plain Paper 1 Image Density | Plain Paper 2 Image Density | Pigment Dispersion Storage Stability | Ink Storage Stability |
| Example | Polymer No. | Other Dispersible Material | Pigment |  |  |  |  |
| Example 9 | 1 | — | MP | A | A | A | A |
| Example 10 | 1 | — | YP | A | A | A | A |
| Example 11 | 2 | — | CB | A | A | B | A |
| Example 12 | 3 | — | CB | A | A | B | A |
| Example 13 | 4 | — | CB | A | A | B | B |
| Example 14 | 5 | — | CB | A | A | B | B |
| Example 15 | 6 | — | CB | A | A | A | A |
| Example 16 | 7 | — | CB | A | B | A | A |
| Example 17 | 8 | — | CB | B | B | A | A |
| Example 18 | 9 | — | CB | B | B | A | A |
| Example 19 | 10 | — | CB | A | B | A | A |
| Example 20 | 11 | — | CB | A | B | A | A |
| Example 21 | 12 | — | CB | A | B | B | B |
| Example 22 | 13 | — | CB | B | C | B | B |
| Example 23 | 14 | — | CB | B | B | B | B |
| Example 24 | 15 | — | CB | B | B | B | B |
| Example 25 | 16 | — | CB | B | B | C | C |
| Example 26 | 17 | — | CB | B | B | A | A |
| Example 27 | 18 | — | CB | A | B | A | A |
| Example 28 | 19 | — | CB | A | B | A | A |
| Example 29 | 20 | — | CB | A | B | B | B |
| Example 30 | 21 | — | CB | B | B | A | A |
| Example 31 | 22 | — | CB | A | B | A | A |
| Example 32 | 23 | — | CB | A | B | A | A |
| Example 33 | 24 | — | CB | A | B | B | B |
| Example 34 | 25 | — | CB | A | B | C | C |
| Example 35 | 26 | — | CB | A | B | B | B |
| Example 36 | 27 | — | CB | A | B | B | B |
| Example 37 | 28 | — | CB | A | B | C | C |
| Example 38 | 29 | — | CB | A | B | A | A |
| Example 39 | 30 | — | CB | A | B | A | A |

CB: Carbon Black
CP: Cyan Pigment
MP: Magenta Pigment
YP: Yellow Pigment
*1: Naphthalene sulfonic acid Na formalin condensate
*2: Aqueous solution of hydroxy ethylidene diphosphonic acid potassium

|  |  | Pigment Dispersion | | Effect | | | |
|---|---|---|---|---|---|---|---|
|  |  |  |  | Plain Paper 1 Image Density | Plain Paper 2 Image Density | Pigment Dispersion Storage Stability | Ink Storage Stability |
| Example | Polymer No. | Other Dispersible Material | Pigment |  |  |  |  |
| Example 40 | 31 | *1 | CB | A | B | B | B |
| Example 41 | 32 | *1 | CB | B | B | B | B |
| Example 42 | 33 | *1 | CB | A | B | B | B |
| Example 43 | 34 | *1 | CB | B | B | C | A |
| Example 44 | 31 | *1 | CB | A | A | A | A |
| Example 45 | 31 | — | CP | A | A | A | A |
| Example 46 | 31 | — | MP | A | A | A | A |
| Example 47 | 31 | — | YP | A | A | A | A |
| Example 48 | 32 | — | CB | A | A | B | A |
| Example 49 | 33 | — | CB | A | A | B | A |
| Example 50 | 34 | — | CB | A | A | A | A |
| Example 51 | 35 | — | CB | A | B | A | B |
| Example 52 | 36 | — | CB | A | B | B | A |
| Example 53 | 37 | — | CB | B | B | A | A |
| Example 54 | 38 | — | CB | A | B | A | A |
| Example 55 | 39 | — | CB | A | B | A | A |
| Example 56 | 40 | — | CB | A | B | B | B |
| Example 57 | 41 | — | CB | B | C | B | B |
| Example 58 | 42 | — | CB | B | B | B | B |
| Example 59 | 43 | — | CB | B | B | B | B |
| Example 60 | 44 | — | CB | B | B | C | C |
| Example 61 | 45 | — | CB | B | B | A | A |

-continued

| Example | Polymer No. | Pigment Dispersion Other Dispersible Material | Pigment | Plain Paper 1 Image Density | Plain Paper 2 Image Density | Pigment Dispersion Storage Stability | Ink Storage Stability |
|---|---|---|---|---|---|---|---|
| Example 62 | 46 | — | CB | A | B | B | B |
| Example 63 | 47 | — | CB | A | B | B | B |
| Example 64 | 48 | — | CB | A | B | B | B |
| Example 65 | 49 | — | CB | B | B | A | A |
| Example 66 | 50 | — | CB | A | B | A | A |
| Example 67 | 51 | — | CB | A | B | A | A |
| Example 68 | 52 | — | CB | A | B | B | B |
| Example 69 | 53 | — | CB | A | B | C | C |
| Example 70 | 54 | — | CB | A | B | B | B |
| Example 71 | 55 | — | CB | A | B | B | B |
| Example 72 | 56 | — | CB | A | B | C | C |
| Comparative Example 1 | 57 | — | CB | B | C | D | D |
| Comparative Example 2 | *2 | — | CB | E | E | E | E |

CB: Carbon Black
CP: Cyan Pigment
MP: Magenta Pigment
YP: Yellow Pigment
*1: Naphthalene sulfonic acid Na formalin condensate
*2: Aqueous solution of hydroxy ethylidene diphosphonic acid potassium Tables 3 and 4 prove the inks of Examples produce images having higher image density than those produced by the inks of Comparative Examples even on plain papers, and have good storage stability even when including the hydrosoluble organic solvent in an amount greater than 20% by weight.

Having now fully described the invention, it will be apparent to one of ordinary skill in the art that many changes and modifications can be made thereto without departing from the spirit and scope of the invention as set forth therein.

What is claimed is:

1. An ink for inkjet recording, comprising water;

a hydrosoluble organic solvent;

a pigment; and a polymer, comprising:

a first structural unit represented by the following formula (1):

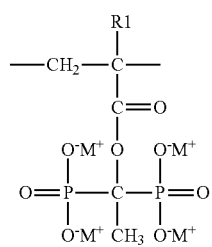

(1)

wherein R1 represents a hydrogen atom or a methyl group; and M$^+$ represents at least one member selected from the group consisting of alkali metal ions, organic amine ions and hydrogen ions; and a second structural unit represented by the following formula (2) or (3):

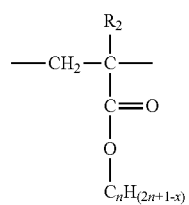

(2)

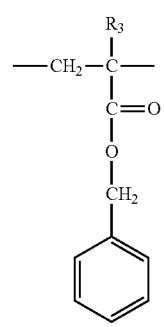

(3)

wherein each of $R_2$ and $R_3$ represents a methyl group or a hydrogen atom; n represents an integer of 18; x represents 0 or an integer of 2.

2. The ink for inkjet recording of claim 1, wherein the second structural unit represented by the formula (2) is a structural unit represented by the following formula (2a) having a straight-chain alkyl group having 18 carbon atoms or a structural unit represented by the following formula (2b) having a straight-chain alkenyl group having 18 carbon atoms:

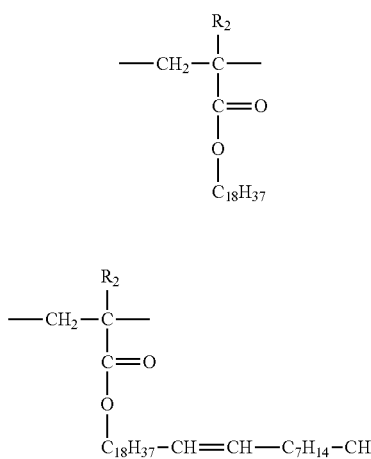
(2a)

(2b)

wherein $R_2$ represents a methyl group or a hydrogen atom.

3. The ink for inkjet recording of claim 2, wherein the structural unit represented by the formula (2a) is a structural unit represented by the following formula (5):

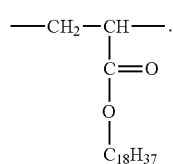
(5)

4. The ink for inkjet recording of claim 2, wherein the structural unit represented by the formula (2b) is a structural unit represented by the following formula (6):

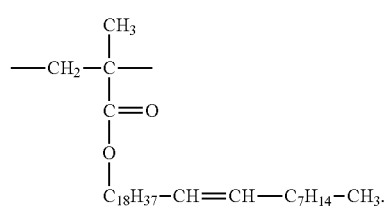
(6)

5. The ink for inkjet recording of claim 1, wherein the polymer comprises the first structural unit represented by the formula (1) in an amount of from 10 to 60% by weight.

6. The ink for inkjet recording of claim 1, wherein the first structural unit represented by the formula (1) is a structural unit represented by the following formula (4):

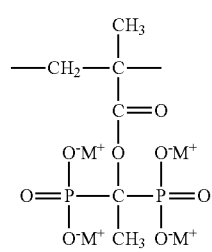
(4)

wherein $M^+$ represents at least one member selected from the group consisting of alkali metal ions, organic amine ions and hydrogen ions.

7. The ink for inkjet recording of claim 1, wherein the second structural unit represented by the formula (3) is a structural unit represented by the following formula (7):

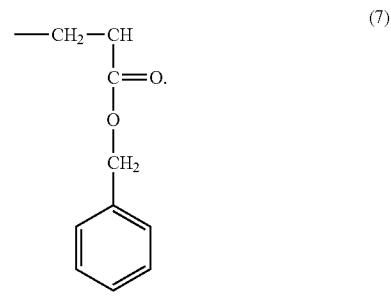
(7)

8. The ink for inkjet recording of claim 1, wherein $M^+$ in the formula (1) is a potassium ion.

9. The ink for inkjet recording of claim 1, wherein the polymer has a weight-average molecular weight of from 4,000 to 50,000.

10. The ink for inkjet recording of claim 1, wherein the polymer is a pigment dispersant.

11. An ink container, comprising an ink containing member containing the ink for inkjet recording of claim 1.

12. An inkjet recorder, comprising:
an inkjet head configured to record information or images on a recording medium; and
the ink container according to claim 11.

13. An ink for inkjet recording, comprising
water;
a hydrosoluble organic solvent;
a pigment; and
a polymer obtained from a first compound represented by the following formula (8) and a second compound represented by the following formula (9) or (10):

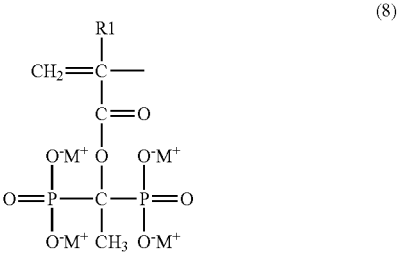
(8)

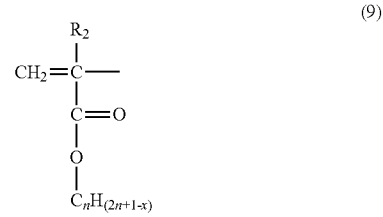
(9)

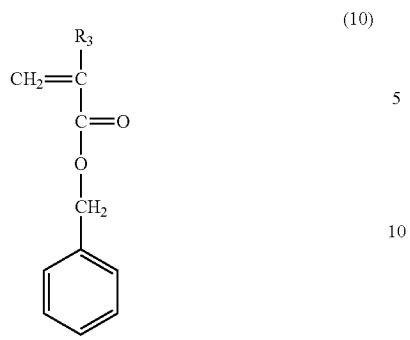 (10)

wherein each of $R_1$, $R_2$ and $R_3$ represents a hydrogen atom or a methyl group; n represents an integer of 18; and x represents 0 or an integer of 2.

14. The ink for inkjet recording of claim 13, wherein the polymer has a weight-average molecular weight of from 4,000 to 50,000.

15. The ink for inkjet recording of claim 13, wherein the polymer is a pigment dispersant.

16. An ink container, comprising an ink containing member containing the ink for inkjet recording of claim 13.

17. An inkjet recorder, comprising:
   an inkjet head configured to record information or images on a recording medium; and
   the ink container according to claim 16.

* * * * *